United States Patent
Linna et al.

(10) Patent No.: US 7,137,383 B2
(45) Date of Patent: *Nov. 21, 2006

(54) CAPILLARY FUEL INJECTOR WITH METERING VALVE FOR AN INTERNAL COMBUSTION ENGINE

(75) Inventors: Jan-Roger Linna, Boston, MA (US); John Baron, Lexington, MA (US); Roberto O. Pellizzari, Groton, MA (US); Peter Loftus, Cambridge, MA (US); Peter Palmer, Waltham, MA (US); John Paul Mello, Belmont, MA (US); Stuart Bennett Sprague, Somerville, MA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,386

(22) Filed: Oct. 19, 2004

(65) Prior Publication Data
US 2005/0081833 A1    Apr. 21, 2005

Related U.S. Application Data

(63) Continuation of application No. 10/342,267, filed on Jan. 15, 2003, now Pat. No. 6,820,598, which is a continuation-in-part of application No. 10/143,250, filed on May 10, 2002, now Pat. No. 6,779,513.

(60) Provisional application No. 60/367,121, filed on Mar. 22, 2002.

(51) Int. Cl.
*F02M 51/00* (2006.01)

(52) U.S. Cl. .................................. 123/549

(58) Field of Classification Search ........ 123/543–557, 123/198 A, 179.21; 239/136
See application file for complete search history.

(56) References Cited

U.S. PATENT DOCUMENTS

| 3,608,531 | A | * | 9/1971 | Baxendale et al. ......... 123/457 |
| 3,716,416 | A | | 2/1973 | Adlhart et al. |
| 3,868,939 | A | | 3/1975 | Friese et al. |
| 3,999,525 | A | | 12/1976 | Stumpp et al. |
| 4,034,729 | A | | 7/1977 | Omachi et al. |
| 4,167,158 | A | * | 9/1979 | Martin et al. ............... 123/484 |

(Continued)

FOREIGN PATENT DOCUMENTS

DE    40 22 335    1/1992

(Continued)

*Primary Examiner*—Marguerite McMahon
(74) *Attorney, Agent, or Firm*—Roberts, Mlotkowski & Hobbes

(57) ABSTRACT

A fuel injector for vaporizing a liquid fuel for use in an internal combustion engine. The fuel injector includes at least one capillary flow passage, a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage; and a valve for metering fuel to the internal combustion engine, the valve located proximate to the outlet end of the at least one capillary flow passage, the valve including a low mass member for substantially occluding the stream of fuel to the internal combustion engine; wherein the low mass member for substantially occluding the stream of fuel to the internal combustion engine is formed of a material having low mass and or a low coefficient of thermal conductivity. The fuel injector is effective in reducing cold-start and warm-up emissions of an internal combustion engine.

40 Claims, 18 Drawing Sheets

U.S. PATENT DOCUMENTS

| | | | | |
|---|---|---|---|---|
| 4,210,103 | A | 7/1980 | Dimitroff et al. | |
| 4,218,021 | A | 8/1980 | Palma | 239/585 |
| 4,223,652 | A | 9/1980 | Budnicki | |
| 4,344,402 | A | 8/1982 | Child et al. | 123/538 |
| 4,345,569 | A | 8/1982 | Hattori et al. | 123/549 |
| 4,356,980 | A | 11/1982 | Krauss | |
| 4,395,989 | A | 8/1983 | Eshelman et al. | |
| 4,403,576 | A | 9/1983 | Dimitroff et al. | |
| 4,458,655 | A | 7/1984 | Oza | 123/558 |
| 4,477,027 | A | 10/1984 | Knapp et al. | 239/585 |
| 4,483,307 | A | 11/1984 | Gilmor | 123/558 |
| 4,784,213 | A | 11/1988 | Eager et al. | |
| 4,870,932 | A | 10/1989 | Asmus | |
| 4,886,032 | A | 12/1989 | Asmus | |
| 4,955,351 | A | 9/1990 | Lewis et al. | 123/557 |
| 4,958,773 | A | 9/1990 | Stettner et al. | |
| 4,958,774 | A | 9/1990 | Taylor | |
| 4,970,865 | A * | 11/1990 | Shekelton et al. | 60/757 |
| 5,040,497 | A | 8/1991 | Dingle | |
| 5,054,454 | A | 10/1991 | Hamburg | |
| 5,121,730 | A | 6/1992 | Ausman et al. | |
| 5,195,477 | A | 3/1993 | Hudson, Jr. et al. | |
| 5,226,400 | A | 7/1993 | Birch | |
| 5,273,215 | A | 12/1993 | Hans et al. | |
| 5,331,937 | A | 7/1994 | Clarke | |
| 5,332,046 | A | 7/1994 | Tanimizu et al. | |
| 5,343,848 | A | 9/1994 | Birch et al. | |
| 5,408,967 | A | 4/1995 | Foster | |
| 5,482,023 | A | 1/1996 | Hunt et al. | |
| 5,524,582 | A | 6/1996 | Suh et al. | |
| 5,529,035 | A | 6/1996 | Hunt et al. | |
| 5,685,494 | A | 11/1997 | Kubach et al. | 239/585.5 |
| 5,743,251 | A | 4/1998 | Sweeney et al. | |
| 5,758,826 | A | 6/1998 | Nines | |
| 5,813,388 | A | 9/1998 | Cikanek, Jr. et al. | 123/549 |
| 5,823,444 | A | 10/1998 | Reiter et al. | 239/533.12 |
| 5,836,289 | A | 11/1998 | Thring | 123/549 |
| 5,881,957 | A * | 3/1999 | Mizuno et al. | 239/533.2 |
| 5,894,832 | A | 4/1999 | Nogi et al. | |
| 5,947,091 | A | 9/1999 | Krohn et al. | 123/549 |
| 6,026,787 | A | 2/2000 | Sun et al. | |
| 6,067,970 | A | 5/2000 | Awarzamani et al. | 123/549 |
| 6,067,971 | A | 5/2000 | Cikanek, Jr. et al. | 123/549 |
| 6,079,636 | A | 6/2000 | Rembold et al. | |
| 6,102,303 | A | 8/2000 | Bright et al. | |
| 6,109,247 | A | 8/2000 | Hunt | 123/549 |
| 6,119,670 | A | 9/2000 | Lavi | |
| 6,145,494 | A | 11/2000 | Klopp | |
| 6,189,516 | B1 | 2/2001 | Hei Ma | |
| 6,189,518 | B1 | 2/2001 | Cooke | 123/549 |
| 6,189,803 | B1 | 2/2001 | Ganan-Calvo | |
| 6,209,309 | B1 | 4/2001 | McArthur | |
| 6,234,153 | B1 | 5/2001 | DeGroot et al. | |
| 6,237,576 | B1 | 5/2001 | Buccino et al. | 123/549 |
| 6,276,347 | B1 | 8/2001 | Hunt | 123/549 |
| 6,289,881 | B1 | 9/2001 | Klopp | |
| 6,332,457 | B1 | 12/2001 | Imoehl | 123/549 |
| 6,354,256 | B1 | 3/2002 | Ohanian et al. | 123/179.21 |
| 6,357,677 | B1 | 3/2002 | Ren et al. | |
| 6,360,960 | B1 | 3/2002 | Nally, Jr. et al. | |
| 6,390,076 | B1 | 5/2002 | Hunt | 123/549 |
| 6,499,674 | B1 | 12/2002 | Ren et al. | |
| 6,502,761 | B1 | 1/2003 | Pace et al. | |
| 6,550,696 | B1 | 4/2003 | Mansour et al. | |
| 6,568,390 | B1 | 5/2003 | Nichols et al. | |
| 2001/0020469 | A1 | 9/2001 | Hunt | 123/549 |
| 2001/0054608 | A1 | 12/2001 | Ohkuma et al. | |
| 2002/0130193 | A1 | 9/2002 | Peterson, Jr. | |
| 2002/0130284 | A1 | 9/2002 | Knebel et al. | |
| 2003/0056790 | A1 | 3/2003 | Nichols et al. | |
| 2003/0057300 | A1 | 3/2003 | Peterson, Jr. | 239/533.12 |

FOREIGN PATENT DOCUMENTS

| | | |
|---|---|---|
| DE | 37 19 234 | 12/1998 |
| EP | 0 849 375 | 6/1998 |
| EP | 0 915 248 | 5/1999 |
| FR | 2 742 811 | 6/1997 |
| GB | 2 147 949 | 5/1985 |
| JP | 58-110854 | 7/1983 |
| JP | 5-141329 | 6/1993 |
| JP | 411-062773 | 3/1999 |
| WO | WO 87/00887 | 2/1987 |
| WO | WO 03/083281 | 10/2003 |

* cited by examiner

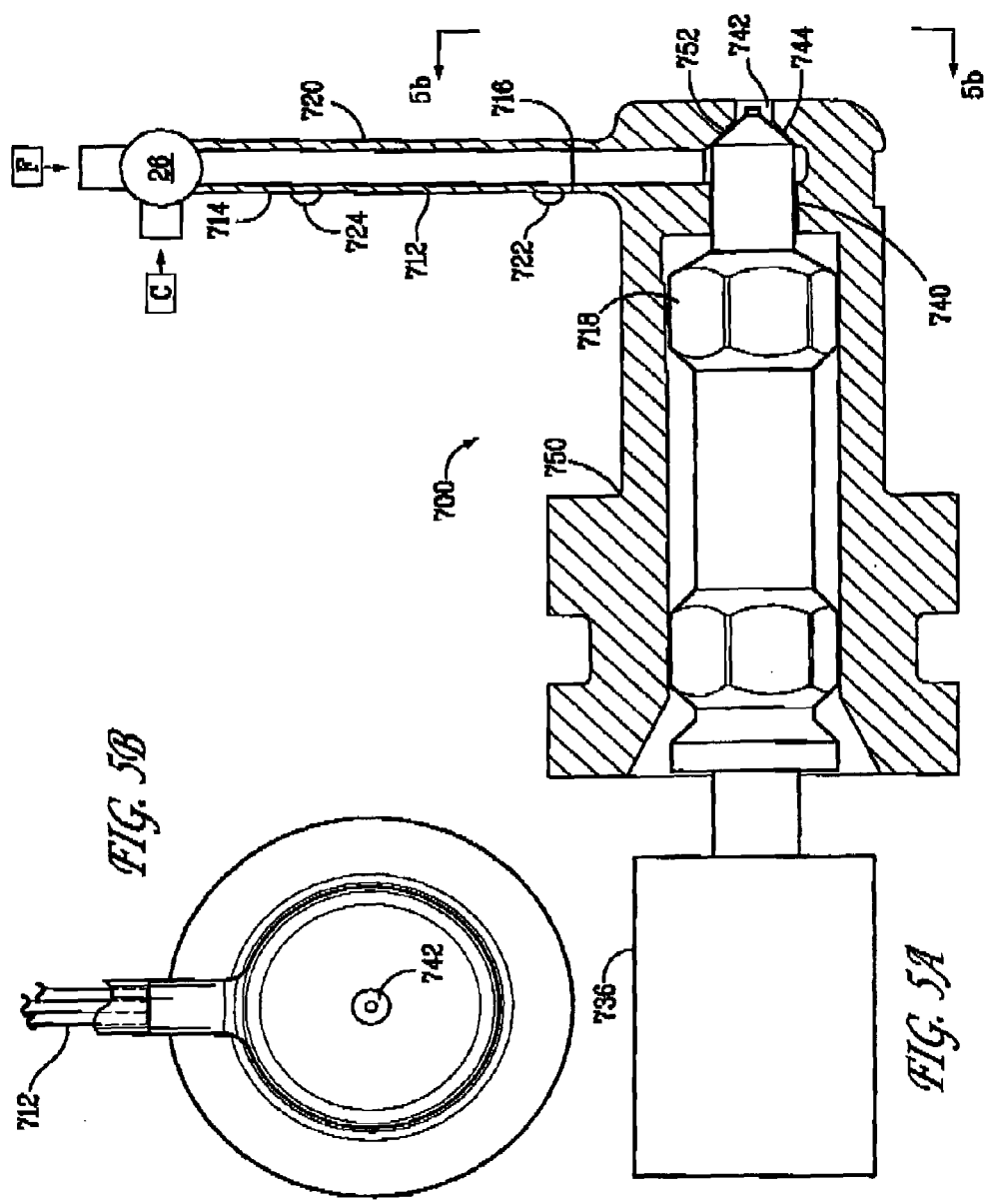

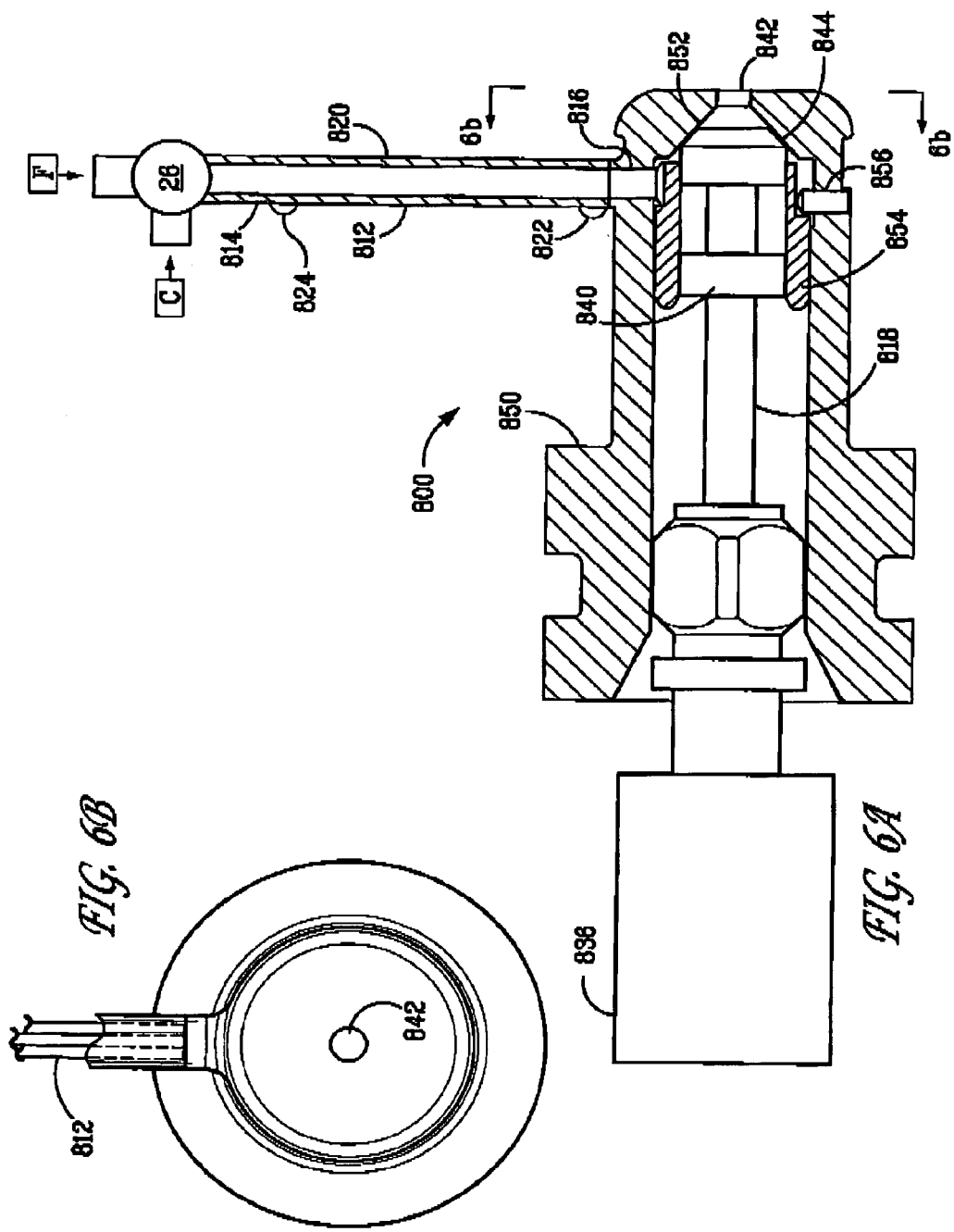

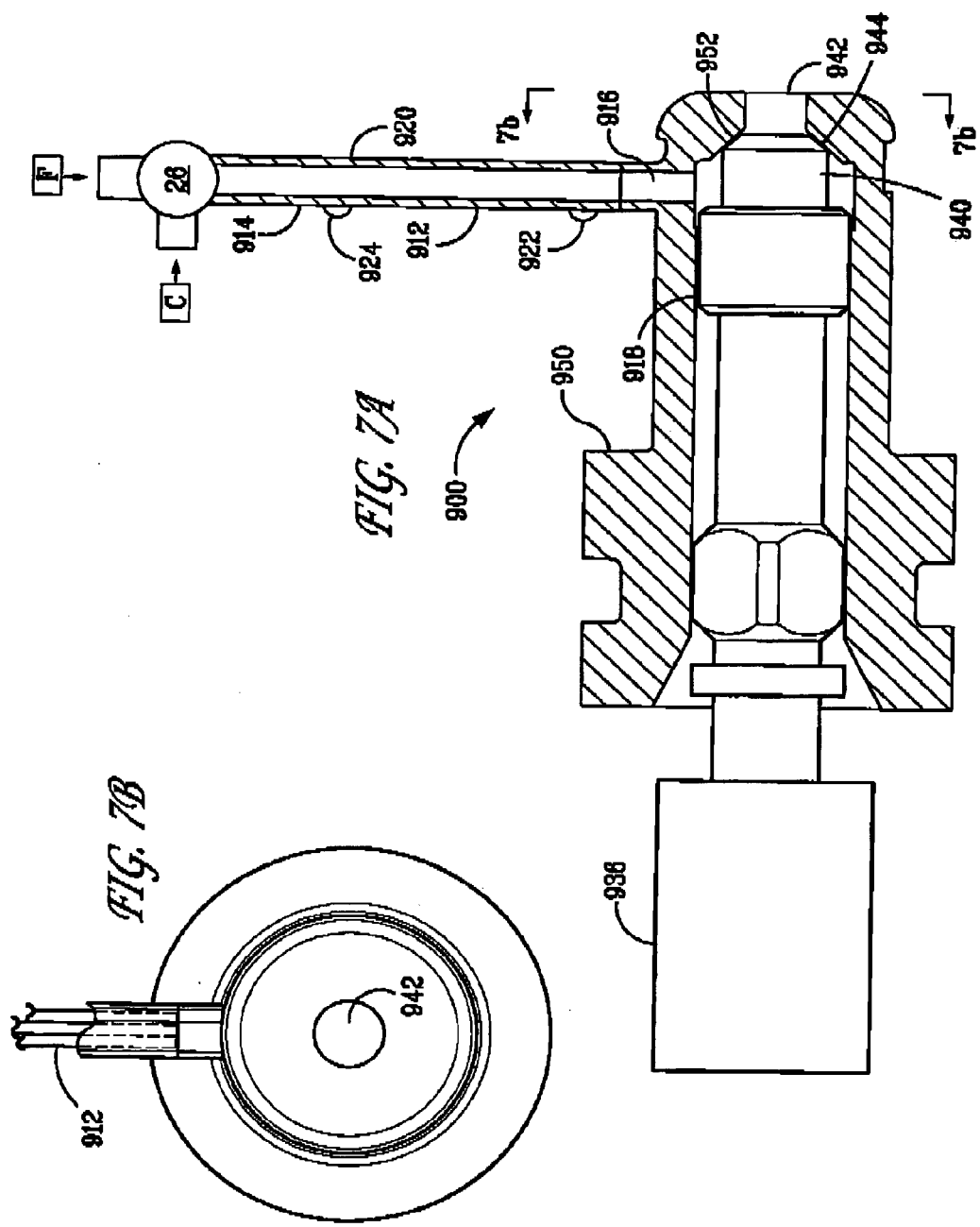

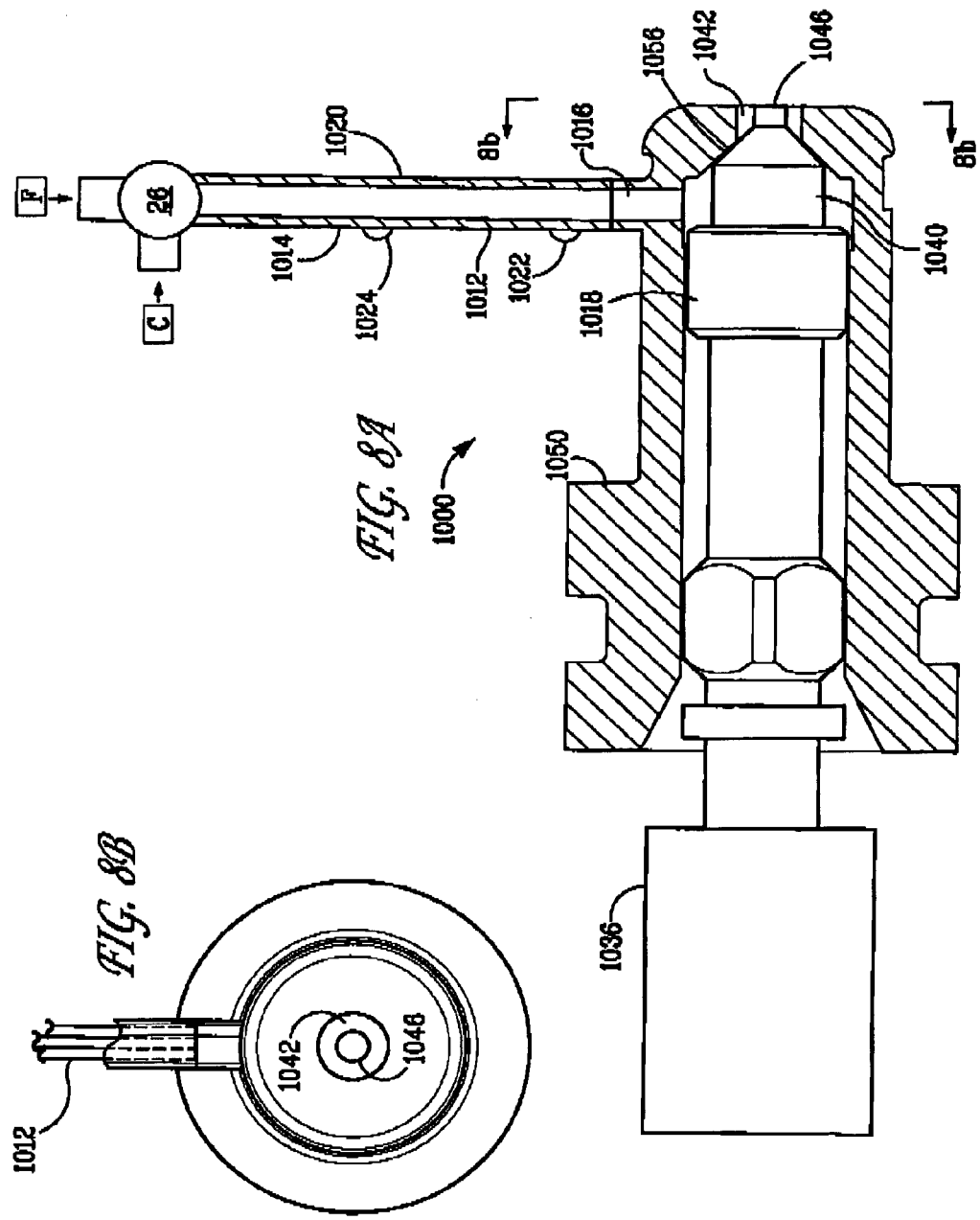

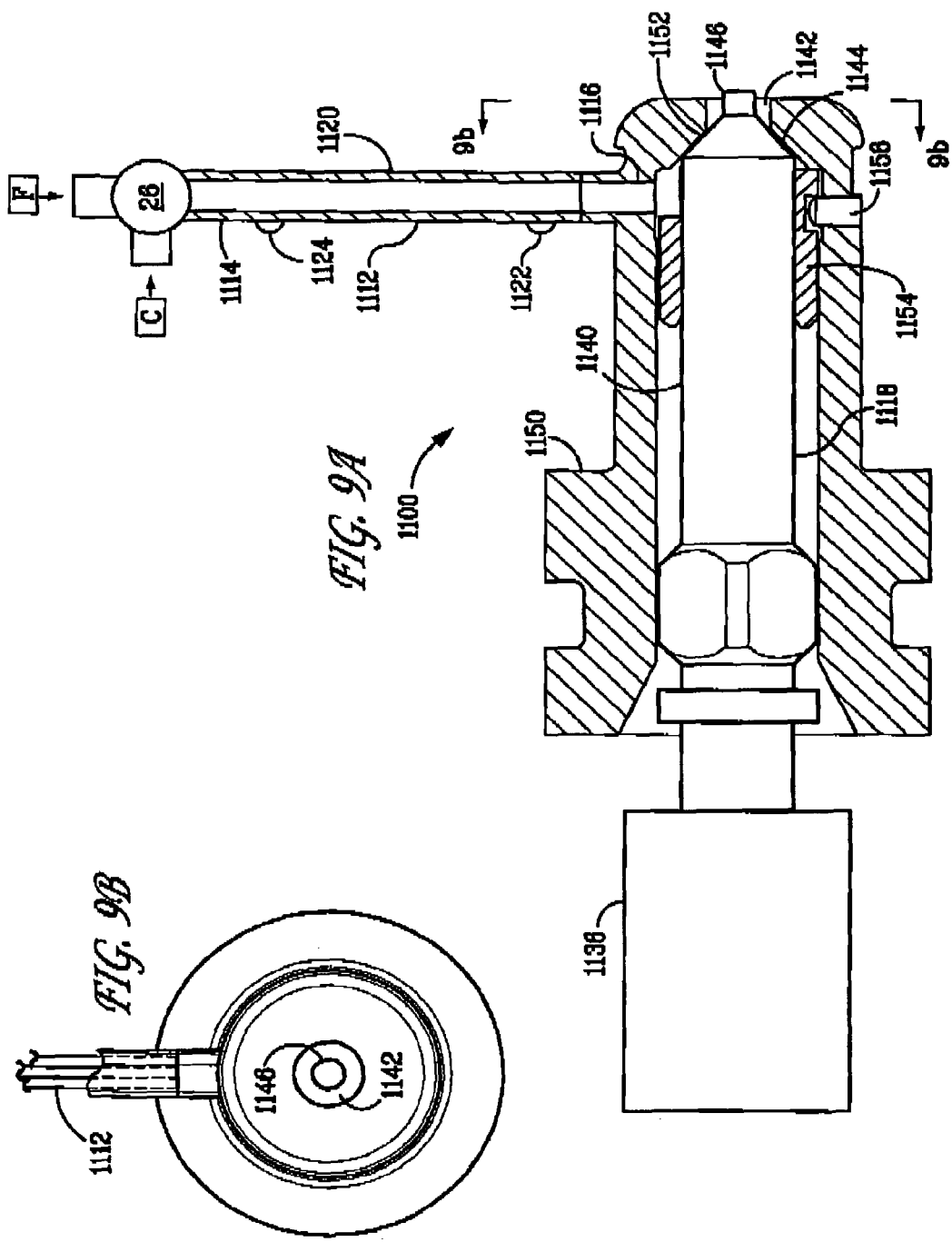

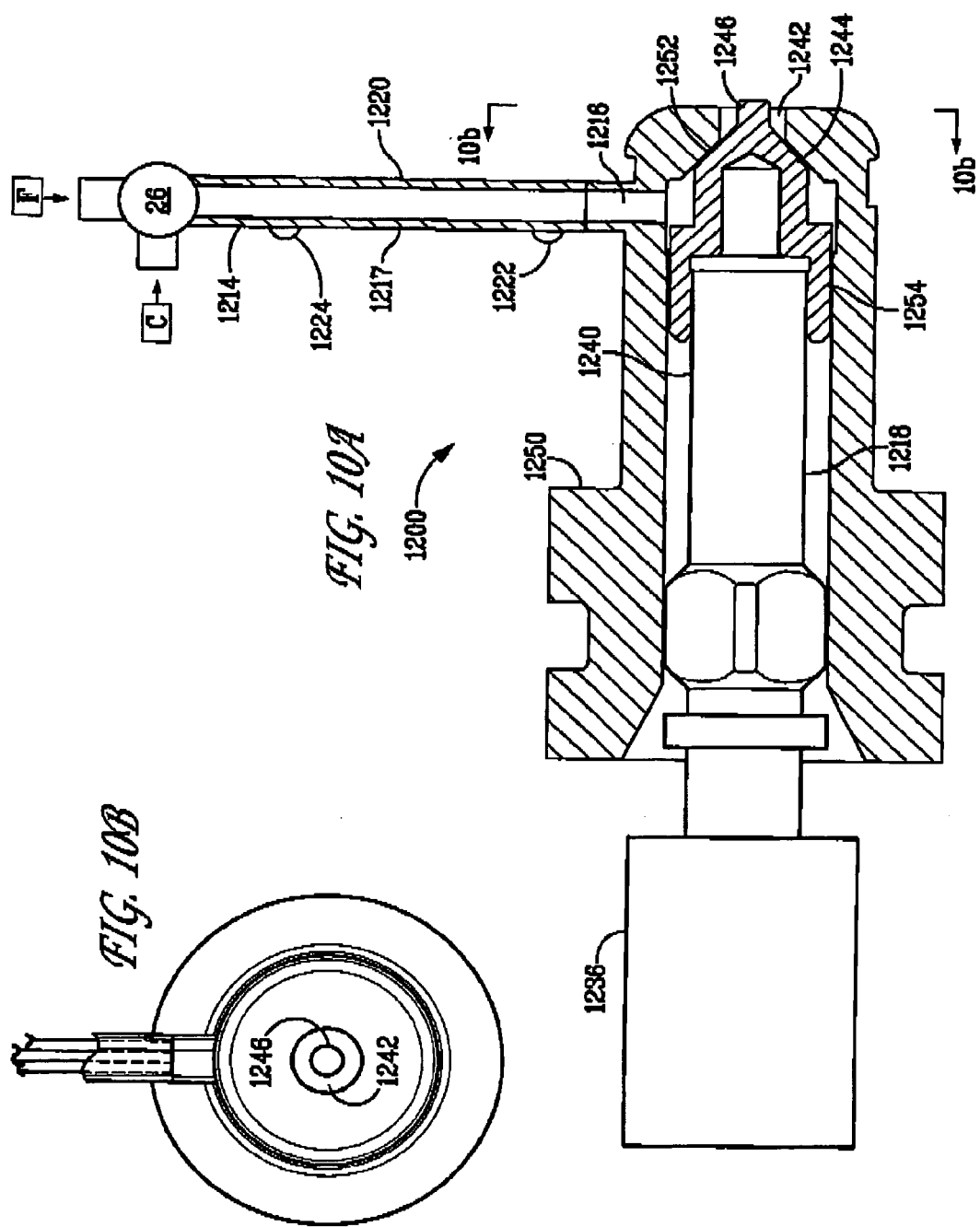

CAPILLARY FUEL INJECTOR WITH METERING VALVE FOR AN INTERNAL COMBUSTION ENGINE

RELATED APPLICATIONS

This patent application is a continuation of application Ser. No. 10/342,267, filed on Jan. 15, 2003 now U.S. Pat. No. 6,820,598, which is a continuation-in-part of application Ser. No. 10/143,250, filed on May 10, 2002 now U.S. Pat. No. 6,779,513, which claims the benefit of Provisional application No. 60/367,121, filed Mar. 22, 2002, directed to a Fuel Injector for an Internal Combustion Engine, which is hereby incorporated by reference.

FIELD

The present invention relates to fuel delivery in an internal combustion engine.

BACKGROUND

Since the 1970's, port-fuel injected engines have utilized three-way catalysts and closed-loop engine controls in order to seek to minimize NOx, CO, and unburned hydrocarbon emissions. This strategy has proven to be particularly effective during normal operation in which the engine and exhaust components have reached sufficient temperatures. However, in order to achieve desirable conversion efficiencies of NOx, CO, and unburned hydrocarbons, the three-way catalyst must be above its inherent catalyst light-off temperature.

In addition, the engine must be at sufficient temperature to allow for vaporization of liquid fuel as it impinges upon intake components, such as port walls and/or the back of valves. The effectiveness of this process is important in that it provides a proper degree of control over the stoichiometry of the fuel/air mixture and, thus, is coupled to idle quality and the performance of the three-way catalyst, and it ensures that the fuel supplied to the engine is burned during combustion and, thus, eliminates the need for over-fueling to compensate for liquid fuel that does not vaporize sufficiently and/or collects on intake components.

In order for combustion to be chemically complete, the fuel-air mixture must be vaporized to a stoichiometric gas-phase mixture. A stoichiometric combustible mixture contains the exact quantities of air (oxygen) and fuel required for complete combustion. For gasoline, this air-to-fuel ratio is about 14.7:1 by weight. A fuel-air mixture that is not completely vaporized, and/or contains more than a stoichiometric amount of fuel, results in incomplete combustion and reduced thermal efficiency. The products of an ideal combustion process are water ($H_2O$) and carbon dioxide ($CO_2$). If combustion is incomplete, some carbon is not fully oxidized, yielding carbon monoxide (CO) and unburned hydrocarbons (HC).

Under cold-start and warm-up conditions, the processes used to reduce exhaust emissions and deliver high quality fuel vapor break down due to relatively cool temperatures. In particular, the effectiveness of three-way catalysts is not significant below approximately 250° C. and, consequently, a large fraction of unburned hydrocarbons pass unconverted to the environment. Under these conditions, the increase in hydrocarbon emissions is exacerbated by over-fueling required during cold-start and warm-up. That is, since fuel is not readily vaporized through impingement on cold intake manifold components, over-fueling is necessary to create combustible mixtures for engine starting and acceptable idle quality.

The mandates to reduce air pollution worldwide have resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

However, inefficient fuel preparation at lower engine temperatures remains a problem which results in higher emissions, requiring after-treatment and complex control strategies. Such control strategies can include exhaust gas recirculation, variable valve timing, retarded ignition timing, reduced compression ratios, the use of catalytic converters and air injection to oxidize unburned hydrocarbons and produce an exothermic reaction benefiting catalytic converter light-off.

As indicated, over-fueling the engine during cold-start and warm-up is a significant source of unburned hydrocarbon emissions in conventional engines. It has been estimated that as much as 80 percent of the total hydrocarbon emissions produced by a typical, modern port fuel injected (PFI) gasoline engine passenger car occurs during the cold-start and warm-up period, in which the engine is over-fueled and the catalytic converter is essentially inactive.

Given the relatively large proportion of unburned hydrocarbons emitted during startup, this aspect of passenger car engine operation has been the focus of significant technology development efforts. Furthermore, as increasingly stringent emissions standards are enacted into legislation and consumers remain sensitive to pricing and performance, these development efforts will continue to be paramount. Such efforts to reduce start-up emissions from conventional engines generally fall into two categories: 1) reducing the warm-up time for three-way catalyst systems and 2) improving techniques for fuel vaporization. Efforts to reduce the warm-up time for three-way catalysts to date have included: retarding the ignition timing to elevate the exhaust temperature; opening the exhaust valves prematurely; electrically heating the catalyst; burner or flame heating the catalyst; and catalytically heating the catalyst. As a whole, these efforts are costly and do not address HC emissions during and immediately after cold start.

A variety of techniques have been proposed to address the issue of fuel vaporization. U.S. patents proposing fuel vaporization techniques include U.S. Pat. No. 5,195,477 issued to Hudson, Jr. et al, U.S. Pat. No. 5,331,937 issued to Clarke, U.S. Pat. No. 4,886,032 issued to Asmus, U.S. Pat. No. 4,955,351 issued to Lewis et al., U.S. Pat. No. 4,458,655 issued to Oza, U.S. Pat. No. 6,189,518 issued to Cooke, U.S. Pat. No. 5,482,023 issued to Hunt, U.S. Pat. No. 6,109,247 issued to Hunt, U.S. Pat. No. 6,067,970 issued to Awarzamani et al., U.S. Pat. No. 5,947,091 issued to Krohn et al., U.S. Pat. No. 5,758,826 issued to Nines, U.S. Pat. No. 5,836,289 issued to Thring, and U.S. Pat. No. 5,813,388 issued to Cikanek, Jr. et al.

Other fuel delivery devices proposed include U.S. Pat. No. 3,716,416, which discloses a fuel-metering device for use in a fuel cell system. The fuel cell system is intended to be self-regulating, producing power at a predetermined level. The proposed fuel metering system includes a capillary flow control device for throttling the fuel flow in response to the power output of the fuel cell, rather than to provide improved fuel preparation for subsequent combustion. Instead, the fuel is intended to be fed to a fuel reformer for conversion to $H_2$ and then fed to a fuel cell. In a preferred embodiment, the capillary tubes are made of metal and the capillary itself is used as a resistor, which is in electrical contact with the power output of the fuel cell. Because the flow resistance of a vapor is greater than that of a liquid, the flow is throttled as the power output increases. The fuels suggested for use include any fluid that is easily transformed from a liquid to a vapor phase by applying heat and flows freely through a capillary. Vaporization appears to be achieved in the manner that vapor lock occurs in automotive engines.

U.S. Pat. No. 6,276,347 proposes a supercritical or near-supercritical atomizer and method for achieving atomization or vaporization of a liquid. The supercritical atomizer of U.S. Pat. No. 6,276,347 is said to enable the use of heavy fuels to fire small, light weight, low compression ratio, spark-ignition piston engines that typically burn gasoline. The atomizer is intended to create a spray of fine droplets from liquid, or liquid-like fuels, by moving the fuels toward their supercritical temperature and releasing the fuels into a region of lower pressure on the gas stability field in the phase diagram associated with the fuels, causing a fine atomization or vaporization of the fuel. Utility is disclosed for applications such as combustion engines, scientific equipment, chemical processing, waste disposal control, cleaning, etching, insect control, surface modification, humidification and vaporization.

To minimize decomposition, U.S. Pat. No. 6,276,347 proposes keeping the fuel below the supercritical temperature until passing the distal end of a restrictor for atomization. For certain applications, heating just the tip of the restrictor is desired to minimize the potential for chemical reactions or precipitations. This is said to reduce problems associated with impurities, reactants or materials in the fuel stream which otherwise tend to be driven out of solution, clogging lines and filters. Working at or near supercritical pressure suggests that the fuel supply system operate in the range of 300 to 800 psig. While the use of supercritical pressures and temperatures might reduce clogging of the atomizer, it appears to require the use of a relatively more expensive fuel pump, as well as fuel lines, fittings and the like that are capable of operating at these elevated pressures.

OBJECTS AND SUMMARY OF THE PREFERRED FORMS

One object is to provide a fuel injector having improved fuel vaporization characteristics under all engine operating conditions, particularly cold-start and warm-up conditions.

Another object is to provide a fuel injector and delivery system capable of reducing emissions.

It is a further object to provide a fuel injector and delivery system that can supply vaporized fuel while requiring minimal power and warm-up time, without the need for a high pressure fuel supply system, which may be utilized in a number of configurations including conventional port-fuel injection, hybrid-electric, gasoline direct-injection, and alcohol-fueled engines.

These and other objects will become apparent from the detailed description of the preferred forms set out below and now summarized as follows:

A preferred form of the fuel injector for vaporizing a liquid fuel for use in an internal combustion engine is intended to accomplish at least one or more of the aforementioned objects. One such form includes at least one capillary flow passage, said at least one capillary flow passage having an inlet end and at least one outlet end; a heat source arranged along said at least one capillary flow passage, said heat source operable to heat the liquid fuel in said at least one capillary flow passage to a level sufficient to change at least a portion thereof from the liquid state to a vapor state and deliver a stream of substantially vaporized fuel from said outlet end of said at least one capillary flow passage; and a valve for metering fuel to the internal combustion engine, said valve located proximate to said outlet end of said at least one capillary flow passage, said valve including a low mass member for substantially occluding the stream of fuel to the internal combustion engine; wherein said low mass member for substantially occluding the stream of fuel to the internal combustion engine is formed of a material having low mass and/or a low coefficient of thermal conductivity. The fuel injector is effective in reducing cold-start and warm-up emissions of an internal combustion engine. Efficient combustion is promoted by forming an aerosol of fine droplet size when the substantially vaporized fuel condenses in air. The vaporized fuel can be supplied directly or indirectly to a combustion chamber of an internal combustion engine during cold-start and warm-up of the engine, or at other periods during the operation of the engine, and reduced emissions can be achieved due to capacity for improved mixture control during cold-start, warm-up and transient operation.

One preferred form also provides a method of delivering fuel to an internal combustion engine. The method includes the steps of supplying liquid fuel to at least one capillary flow passage of a fuel injector; causing a stream of substantially vaporized fuel to pass through an outlet of the at least one capillary flow passage by heating the liquid fuel in the at least one capillary flow passage; and metering the vaporized fuel to a combustion chamber of the internal combustion engine through a valve located proximate to the outlet end of the at least one capillary flow passage, the valve including a low mass member for substantially occluding the stream of fuel to the internal combustion engine, wherein the low mass member for substantially occluding the stream of fuel to the internal combustion engine is formed of a material having a low mass and/or low coefficient of thermal conductivity.

Another preferred form provides a fuel system for use in an internal combustion engine, the fuel system including a plurality of fuel injectors, each injector including at least one capillary flow passage said at least one capillary flow passage having an inlet end and an outlet end; a heat source arranged along the at least one capillary flow passage, said heat source operable to heat the liquid fuel in said at least one capillary flow passage to a level sufficient to change at least a portion thereof from the liquid state to a vapor state and deliver a stream of substantially vaporized fuel from said outlet end of said at least one capillary flow passage; a valve for metering fuel to the internal combustion engine, said valve located proximate to said outlet end of said at least one capillary flow passage, said valve including a low mass member for substantially occluding the stream of fuel to the internal combustion engine; wherein said low mass member for substantially occluding the stream of fuel to the internal combustion engine is formed of a material having a low mass and/or a coefficient of thermal conductivity; a liquid fuel supply system in fluid communication with said plurality of fuel injectors; and a controller to control the supply of fuel to said plurality of fuel injectors.

According to one preferred form, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 µm or less.

In another preferred form, the means for cleaning deposits includes an oxidizer control valve for placing the at least one capillary flow passage in fluid communication with an oxidizer, the heat source being operable to heat the oxidizer in the at least one capillary flow passage to a level sufficient to oxidize deposits formed during the heating of the liquid fuel. In this embodiment, the oxidizer control valve is operable to alternate between the introduction of liquid fuel and the introduction of oxidizer into the capillary flow passage and enable in-situ cleaning of the capillary flow passage when the oxidizer is introduced into the at least one capillary flow passage. The oxidizer is preferably selected from the group of air, exhaust gas, steam and mixtures thereof.

In another preferred form, the means for cleaning deposits can include a solvent control valve for placing the at least one capillary flow passage in fluid communication with a solvent. In this preferred form, the solvent control valve alternates between the introduction of liquid fuel and the introduction of solvent into the capillary flow passage and enables in-situ cleaning of the capillary flow passage when the solvent is introduced into the at least one capillary flow passage.

BRIEF DESCRIPTION OF THE DRAWINGS

The invention will now be described in more detail with reference to preferred forms of the invention, given only by way of example, and with reference to the accompanying drawings, in which:

FIG. 5A is a partial cross-sectional view of another embodiment of the fuel injector according to yet another preferred form;

FIG. 5B is an end view of the FIG. 5A embodiment.

FIG. 6A is a partial cross-sectional side view of another embodiment of the capillary fuel injector in accordance with still another preferred form;

FIG. 6B is an end view of the FIG. 6A embodiment.

FIG. 7A is a view of another embodiment of a fuel injector according to a preferred form shown in partial cross-section;

FIG. 7B is an end view of the FIG. 7A embodiment.

FIG. 8A is a side view of another embodiment of a fuel injector according to a preferred form, shown in partial cross-section;

FIG. 8B is an end view of the FIG. 8A embodiment.

FIG. 9A is a side view of yet another preferred form of a fuel injector in accordance herewith;

FIG. 9B is an end view of the FIG. 9A embodiment.

FIG. 10A is a side view of another embodiment of a fuel injector, shown in partial cross-section;

FIG. 10B is an end view of the FIG. 10A embodiment.

DETAILED DESCRIPTION OF THE PREFERRED EMBODIMENTS

Figure 1:
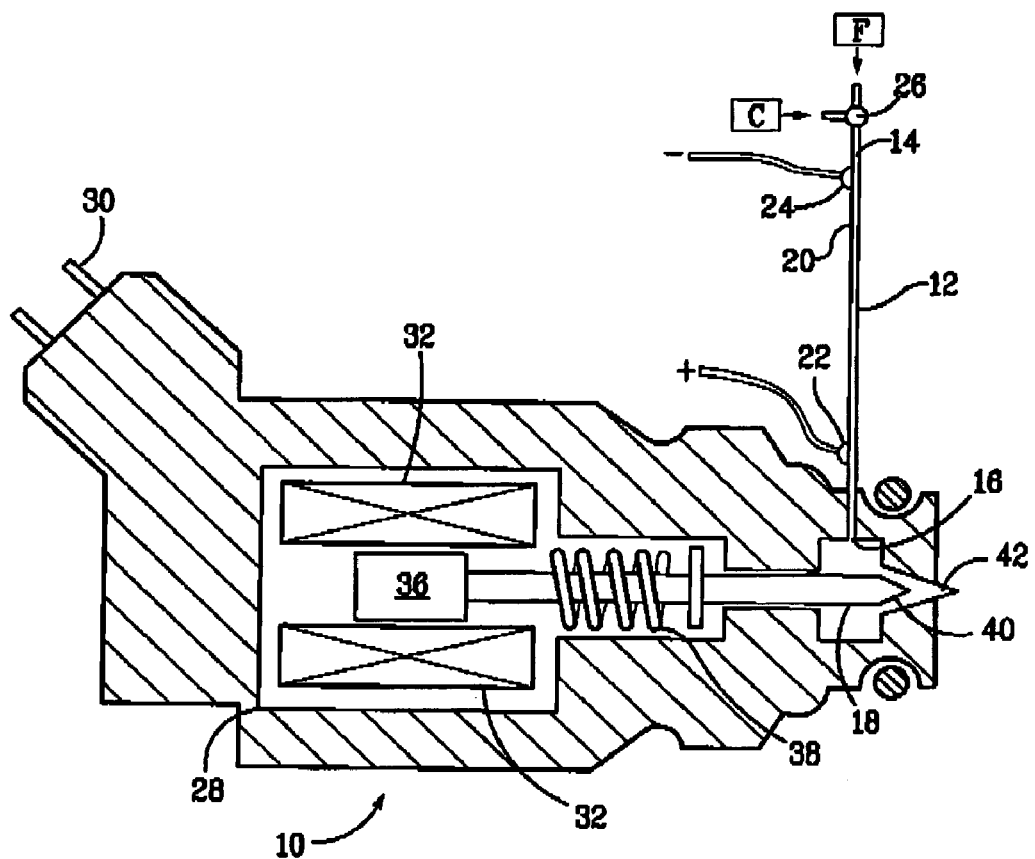
FIG. 1 illustrates a capillary fuel injector, in partial cross section, which includes a side-fed capillary flow passage in accordance with a preferred form.

Reference is now made to the embodiments illustrated in FIGS. 1–19 wherein like numerals are used to designate like parts throughout.

Disclosed herein is a capillary fuel injector with metering valve and fuel system employing same useful for cold-start, warm-up and normal operation of an internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel delivery system of the present invention requires less power, and has shorter warm-up times than other vaporization techniques.

In general, gasolines do not readily vaporize at low temperatures. During the cold start and warm-up period, relatively little vaporization of the liquid fuel takes place. As such, it is necessary to provide an excess of liquid fuel to each cylinder of the engine in order to achieve an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, the liquid fuel readily vaporizes, so that less fuel is needed to achieve an air/fuel mixture that will readily combust. Advantageously, upon reaching normal operating temperature, the air/fuel mixture can be controlled at or near stoichiometry, thereby reducing emissions of unburned hydrocarbons and carbon monoxide. Additionally, when fueling is controlled at or near stoichiometry, just enough air is available in the exhaust stream for simultaneous oxidation of unburned hydrocarbons and carbon monoxide and reduction of nitrogen oxides over a three-way catalyst (TWC) system.

The fuel injector and fuel system disclosed herein injects fuel that has been substantially vaporized into the intake flow passage, or directly into an engine cylinder, thereby eliminating the need for excess fuel during the start-up and warm-up period of an engine. The fuel is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough oxygen to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream that can react over the catalyst surface once the catalyst reaches its light-off temperature. In contrast, the system and method of the present invention enables the engine to operate at stoichiometric or even slightly fuel-lean conditions during the cold-start and warm-up period, eliminating both the need for over-fueling and the need for an additional exhaust air pump, reducing the cost and complexity of the exhaust after treatment system.

As mentioned, during the cold start and warm-up period, the three-way catalyst is initially cold and is not able to reduce a significant amount of the unburned hydrocarbons that pass through the catalyst. Much effort has been devoted to reducing the warm-up time for three-way catalysts, to convert a larger fraction of the unburned hydrocarbons emitted during the cold-start and warm-up period. One such concept is to deliberately operate the engine very fuel-rich during the cold-start and warm-up period. Using an exhaust air pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

The system and method of the present invention may also be utilized with gasoline direct injection engines (GDI). In GDI engines, the fuel is injected directly into the cylinder as a finely atomized spray that evaporates and mixes with air to form a premixed charge of air and vaporized fuel prior to ignition. Contemporary GDI engines require high fuel pressures to atomize the fuel spray. GDI engines operate with stratified charge at part load to reduce the pumping losses inherent in conventional indirect injected engines. A stratified-charge, spark-ignited engine has the potential for burning lean mixtures for improved fuel economy and reduced emissions. Preferably, an overall lean mixture is formed in the combustion chamber, but is controlled to be stoichiometric or slightly fuel-rich in the vicinity of the spark plug at the time of ignition. The stoichiometric portion is thus easily ignited, and this in turn ignites the remaining lean mixture. While pumping losses can be reduced, the operating window currently achievable for stratified charge is limited to low engine speeds and relatively light engine loads. The limiting factors include insufficient time for vaporization and mixing at higher engine speeds and insufficient mixing or poor air utilization at higher loads. By providing vaporized fuel, the system and method of the present invention can widen the operating window for stratified charge operation, solving the problem associated with insufficient time for vaporization and mixing. Advantageously, unlike conventional GDI fuel systems, the fuel pressure employed in the practice of the present invention can be lowered, reducing the overall cost and complexity of the fuel system.

The invention provides a fuel delivery device for an internal combustion engine which includes a pressurized liquid fuel supply that supplies liquid fuel under pressure, at least one capillary flow passage connected to the liquid fuel supply, and a heat source arranged along the at least one capillary flow passage. The heat source is operable to heat liquid fuel in the at least one capillary flow passage sufficiently to deliver a stream of substantially vaporized fuel. The fuel delivery device is preferably operated to deliver the stream of vaporized fuel to one or more combustion chambers of an internal combustion engine during start-up, warm-up, and other operating conditions of the internal combustion engine. If desired, the at least one capillary flow passage can be used to deliver liquid fuel to the engine under normal operating conditions.

The invention also provides a method of delivering fuel to an internal combustion engine, including the steps of supplying the pressurized liquid fuel to at least one capillary flow passage, and heating the pressurized liquid fuel in the at least one capillary flow passage sufficiently to cause a stream of vaporized fuel to be delivered to at least one combustion chamber of an internal combustion engine during start-up, warm-up, and other operating conditions of the internal combustion engine.

A fuel delivery system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid fuel that enters the flow passage being converted to a vapor as it travels along the passageway. The fuel exits the capillary passageway as a vapor, which optionally contains a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel reaches the boiling point during heating in the capillary flow passage, some of the liquid fuel may not be heated enough to be fully vaporized with the result that a portion of the liquid fuel passes through the outlet of the capillary flow passage along with the vaporized fluid.

The capillary-sized fluid passage is preferably formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage, which can be $8 \times 10^{-5}$ to $7$ mm$^2$, preferably $8 \times 10^{-3}$ to $8 \times 10^{-1}$ mm$^2$ and more preferably $2 \times 10^{-3}$ to $2 \times 10^{-1}$ mm$^2$. Many combinations of a single or multiple capillaries, various pressures, various capillary lengths, amounts of heat applied to the capillary, and different cross-sectional areas will suit a given application.

The liquid fuel can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100–200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine. The low thermal inertia also could provide advantages during normal operation of the engine, such as by improving the responsiveness of the fuel delivery to sudden changes in engine power demands.

In order to meter fuel through the low thermal inertia capillary passages described herein, several valve arrangements effective to regulate vapor flow from the distal end of a fuel injector incorporating a capillary passage are proposed. Because of the small thermal mass of capillary flow passages contemplated herein (<1 g), valve arrangements used to regulate the vapor flow must be designed to add minimal thermal mass to the heated system so that warm-up time and effectiveness is not degraded.

The preferred forms described below each allow for the pulsed delivery of fuel vapor and, in some instances, provide the capacity to switch over to liquid fuel injection. In each of the forms herein described, the vapor flow path through the capillary flow passage is actively or passively heated such that the working fluid is in the vapor phase upon coming into contact with the valve. It is preferred that the valve itself is not actively heated. Advantageously, the metering valves for use herein may be constructed of a thermally insulating material such as ceramic or Teflon®. As may be appreciated, a leak-proof seal is not critical for achieving the turndown ratio necessary for pulse width modulation in an internal combustion engine application, although such a leak-proof seal is preferable.

FIG. 1 presents a fuel injector 10 for vaporizing a liquid fuel, in accordance with a preferred form. Fuel injector 10 includes a capillary flow passage 12, having an inlet end 14 and an outlet end 16, inlet end 14 in fluid communication with a liquid fuel source F for introducing the liquid fuel in a substantially liquid state into capillary flow passage 12.

As is preferred, a low-mass needle valve assembly 18 is operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A needle 40 is connected to the solenoid element 36. Movement of the solenoid element 36, caused by applying electricity to the coil windings 32, causes the needle 40 to be drawn away from an orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from a liquid state to a vapor state and deliver a stream of substantially vaporized fuel from outlet end 16 of capillary flow passage 12. As may be appreciated, this method of vapor delivery into the body of the injector minimizes the volume of material that comes into contact with the vaporized fuel and, therefore, also minimizes the thermal mass that must be heated in order to prevent premature condensation of the vapor.

Figure 2A:
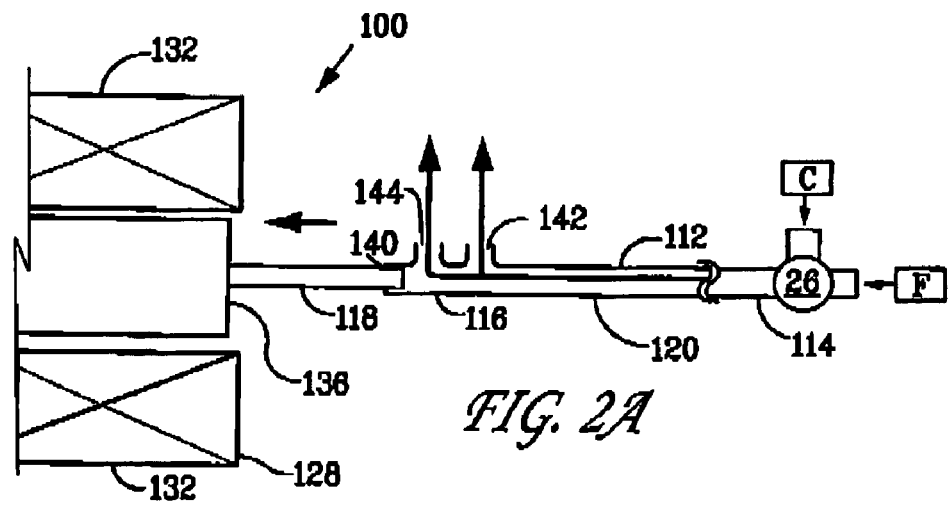
FIG. 2A presents a schematic view of another preferred form in which a plunger is fully retracted, by means of a solenoid, to expose dual radial flow paths, required for vapor delivery.
Figure 2B:
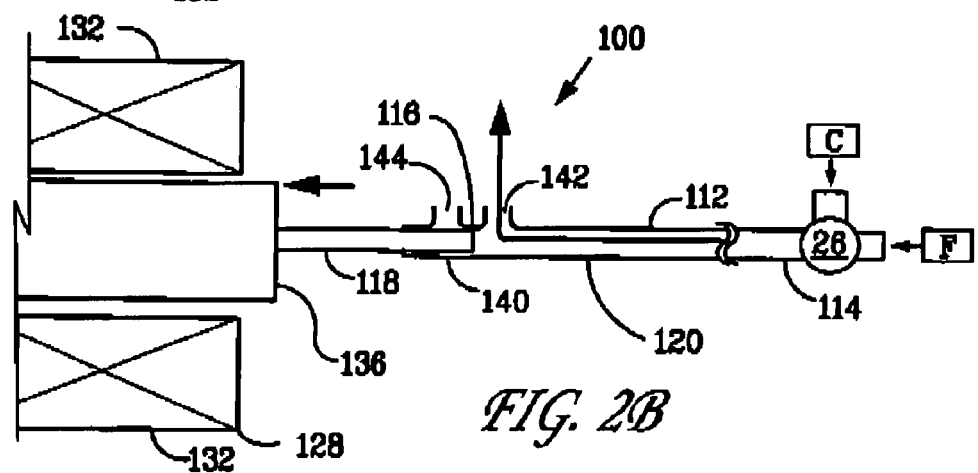
FIG. 2B shows the preferred form of FIG. 2A wherein the plunger is semi retracted to expose a single radial flow path for delivery of liquid fuel.
Figure 2C:
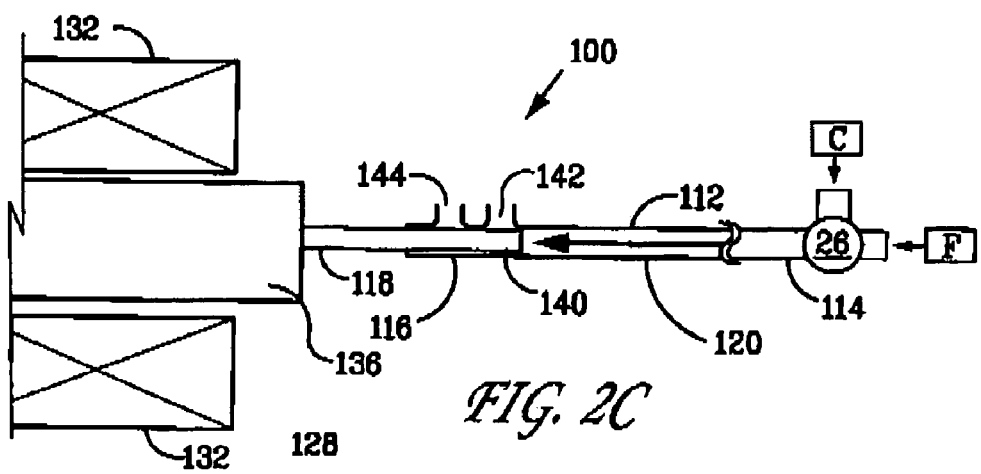
FIG. 2C shows the preferred form of FIG. 2A wherein the plunger is fully extended to block the flow of fuel to the radial flow paths.

FIG. 2A through FIG. 2C depict another preferred form of a fuel injector 100, in which a plunger 140 is actuated, by means of a solenoid 128, along the axis of the capillary flow passage 112. Referring to FIG. 2B, actuation of the solenoid 128 moves the plunger 140 such that an opening 142 in the radial direction of the fluid flow path is exposed, thereby allowing for the flow of liquid fuel when heating is not supplied. Referring to FIG. 2A, further movement of the plunger 140 in the axial direction exposes another radial flow path opening 144, which provides an additional open area, as required for vapor delivery. As is preferred, both openings 142 and 144 are used to supply vaporized fuel.

As shown in FIG. 2A through FIG. 2C, fuel injector metering section 100 includes a capillary flow passage 112, having an inlet end 114 and an outlet end 116, inlet end 114 in fluid communication with a liquid fuel source F for introducing the liquid fuel in a substantially liquid state into capillary flow passage 112. The low-mass plunger assembly 118 is operated by solenoid 128. Solenoid 128 has coil windings 132. When the coil windings 132 are energized, the solenoid element 136 is drawn into the center of coil windings 132. Referring to FIG. 2C, when electricity is cut off from the coil windings 132, the plunger assembly 118 returns to the closed position through the use of a spring (not shown). The plunger 140 is connected to the solenoid element 136. Movement of the solenoid element 136, caused by applying electricity to the coil windings 132, causes the plunger 140 to be drawn away from radial flow path openings 142 and 144 allowing fuel to flow through the orifice. It will be apparent to one skilled in the art that metering section 100 may be combined with conventional actuator sections of the type commonly used in fuel injectors for automotive applications.

Heat source 120 is arranged along capillary flow passage 112. Heat source 120 is formed along with capillary flow passage 112 from a tube of electrically resistive material, a portion of capillary flow passage 112 forming a heater element when a source of electrical current is connected to the tube. Heat source 120 is then operable to heat the liquid fuel in capillary flow passage 112 to a level sufficient to change at least a portion thereof from a liquid state to a vapor state and deliver a stream of substantially vaporized fuel from outlet end 116 of capillary flow passage 112. This method of vapor delivery, along with the design of plunger 140, minimizes the volume of material that comes into contact with the vaporized fuel and, therefore, minimizes the thermal mass that must be heated in order to prevent premature condensation of the vapor.

Figure 3A:
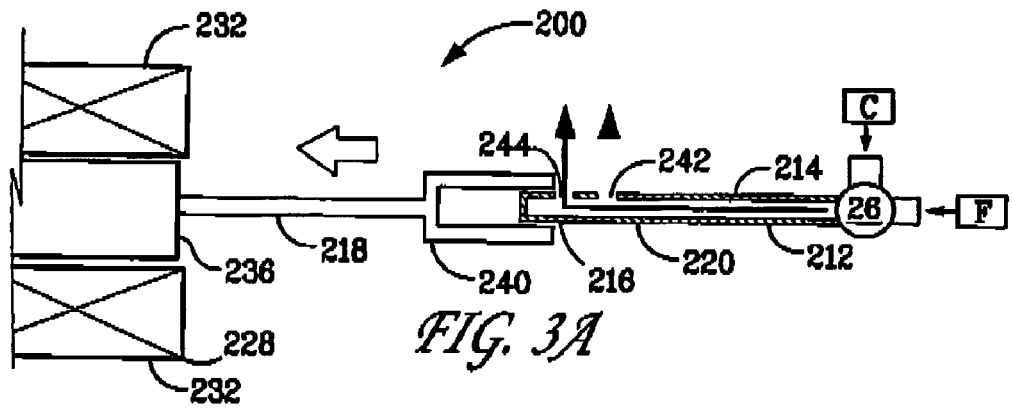
FIG. 3A presents a schematic view of another preferred form in which a sleeve is fully retracted, by means of a solenoid, to expose dual radial flow paths, required for vapor delivery.
Figure 3B:
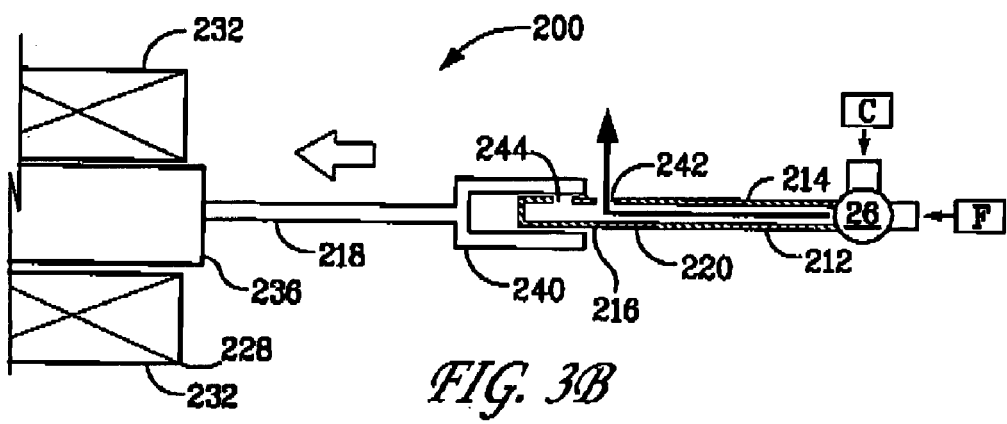
FIG. 3B shows the preferred form of FIG. 3A wherein the sleeve is semi retracted to expose a single radial flow path for delivery of liquid fuel.
Figure 3C:
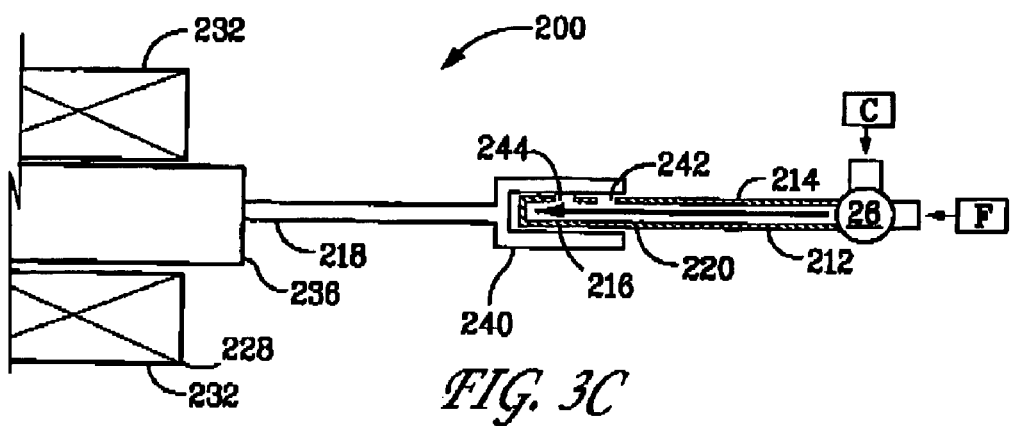
FIG. 3C shows the preferred form of FIG. 3A wherein the sleeve is fully extended to block the flow of fuel to the radial flow paths.

FIG. 3A through FIG. 3C present a variation of the fuel injector metering section form of FIG. 2A through FIG. 2C in which the plunger 140 of FIG. 2A through FIG. 2C is substituted by a sleeve valve 240, which slides over the outlet end 216 of a capillary flow passage 212. Referring to FIG. 3B, actuation of the solenoid 228 moves the sleeve valve 240 such that an opening 242 in the radial direction of the vapor flow path is exposed, thereby allowing for the flow of liquid fuel when heating is not supplied. Referring to FIG. 3A, further movement of the sleeve valve 240 in the axial direction exposes another radial flow path opening 244, which provides additional open area, which is required for vapor delivery, both openings 242 and 244 being used to supply vaporized fuel.

As shown in FIG. 3A through FIG. 3C, fuel injector metering section 200 includes a capillary flow passage 212, having an inlet end 214 and an outlet end 216, inlet end 214 in fluid communication with a liquid fuel source F for introducing the liquid fuel in a substantially liquid state into capillary flow passage 212. The low-mass sleeve assembly 218 is operated by solenoid 228, having coil windings 232. When the coil windings 232 are energized, the solenoid element 236 is drawn into the center of coil windings 232. Referring to FIG. 3C, when electricity is cut off from the coil windings 232, the sleeve assembly 218 returns to the closed position through the use of a spring (not shown). The sleeve valve 240 is connected to the solenoid element 236. Movement of the solenoid element 236, caused by applying electricity to the coil windings 232, causes the sleeve valve 240 to be drawn away from radial flow path openings 242 and 244 allowing fuel to flow through the orifice. Again, it will be apparent to one skilled in the art that metering section 200 may be combined with conventional actuator sections of the type commonly used in fuel injectors for automotive applications.

As with the preferred form of FIG. 2A through FIG. 2C, heat source 220 is arranged along capillary flow passage 212 and is formed along with capillary flow passage 212 from a tube of electrically resistive material, a portion of capillary flow passage 212 forming a heater element when a source of electrical current is connected to the tube. Heat source 220 is then operable to heat the liquid fuel in capillary flow passage 212 to a level sufficient to change at least a portion from a liquid state to a vapor state and deliver a stream of substantially vaporized fuel from outlet end 216 of capillary flow passage 212. This method of vapor delivery, along with the design of sleeve valve 240, minimizes the volume of material that comes into contact with the vaporized fuel and, therefore, minimizes the thermal mass that must be heated in order to prevent premature condensation of the vapor.

Figure 4A:
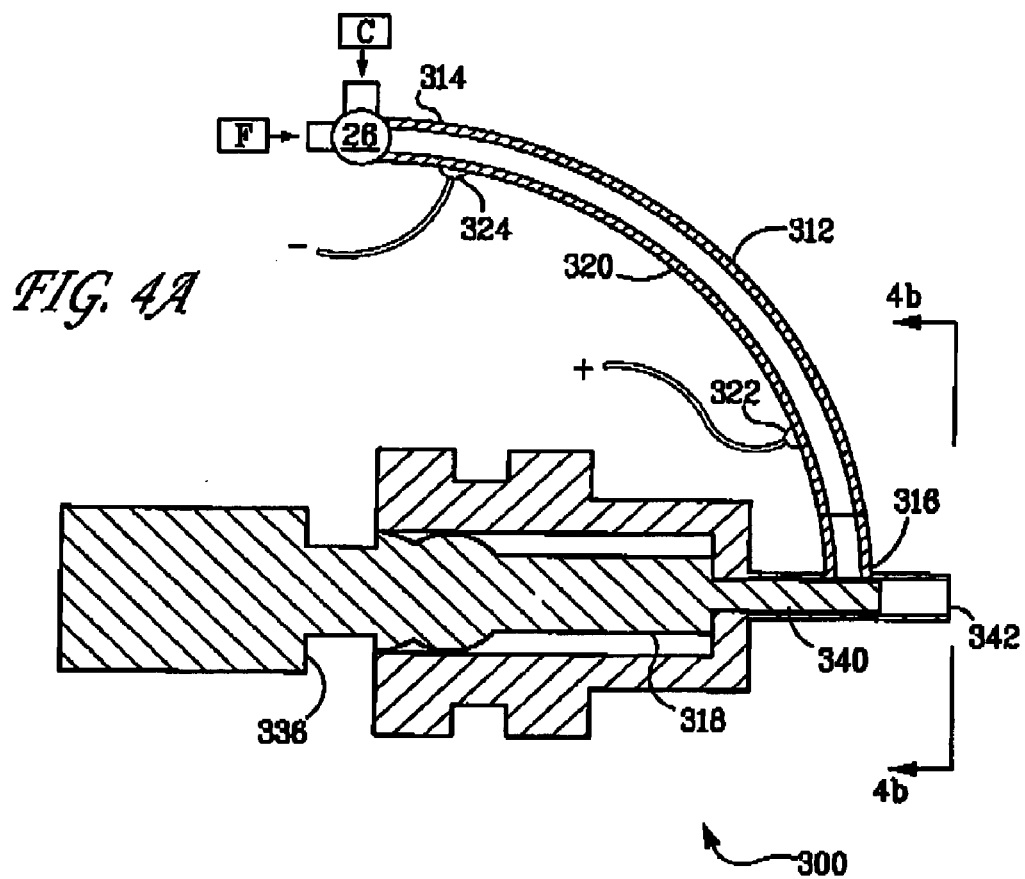
FIG. 4A illustrates an in-line-heated injector having an electrically heated capillary, in partial cross section, incorporated upstream of a modified conventional side-fed port fuel injector, in accordance with a preferred form.
Figure 4B:
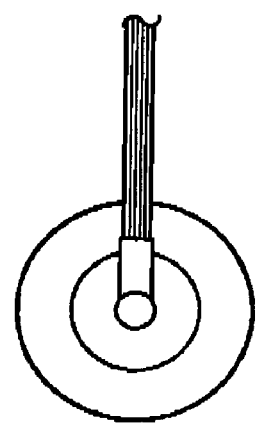
FIG. 4B is an end view of the FIG. 4A embodiment.

FIGS. 4A and B present a fuel injector metering section 300 for vaporizing a liquid fuel, in accordance with another form. Fuel injector metering section 300 includes at least one capillary flow passage 312, having an inlet end 314 and an outlet end 316, inlet end 314 in fluid communication with a liquid fuel source F for introducing the liquid fuel in a substantially liquid state into capillary flow passage 312. Advantageously, fuel injector metering section 300 may include two, three or more capillaries, so that a full range of operation may be provided by the injector (see FIG. 4B). A plunger valve assembly 318 is operated by solenoid (not shown), having coil windings. As in the preferred forms of FIG. 1 through FIG. 3, when the coil windings are energized, the solenoid element 336 is drawn into the center of coil windings. When electricity is cut off, solenoid element 336 returns to its original position through the use of a spring (not shown). A plunger 340 is connected to the solenoid element 336. Movement of the solenoid element 336, caused by applying electricity to the coil windings, causes the plunger 340 to be drawn away from the outlet end 316 of the capillary flow passage 312 allowing fuel to flow through the orifice 342. Again, it will be apparent to one skilled in the art that metering section 300 may be combined with conventional actuator sections of the type commonly used in fuel injectors for automotive applications.

Heat source 320 is arranged along capillary flow passage 312 and is provided by forming capillary flow passage 312 from a tube of electrically resistive material, a portion of capillary flow passage 312 forming a heater element when a source of electrical current is connected to the tube at connections 322 and 324 for delivering current. Heat source 320 is then operable to heat the liquid fuel in capillary flow passage 312 to a level sufficient to change at least a portion thereof from a liquid state to a vapor state and deliver a stream of substantially vaporized fuel from outlet end 316 of capillary flow passage 312. Once again, the volume of material that comes into contact with the vaporized fuel is minimized, minimizing the thermal mass that must be heated in order to prevent premature condensation of the vapor.

FIG. 5 depicts a fuel injector metering section 700 for vaporizing a liquid fuel, in accordance with another preferred form. Fuel injector metering section 700 includes at least one capillary flow passage 712, having an inlet end 714 and an outlet end 716, inlet end 714 placed in fluid communication with a liquid fuel source for introducing the liquid fuel into capillary flow passage 712. Advantageously, fuel injector metering section 700 may include two, three or four capillaries, so that a full range of operation may be provided by the injector (see FIG. 5B).

A plunger valve assembly 718 is positionable within housing 750 and operated by a solenoid (not shown), having coil windings. As is preferred, in operation, when the coil windings are energized, the solenoid element 736 is drawn into the center of coil windings (not shown). When electricity is cut off, solenoid element 736 returns to its original position through the use of a spring (not shown). A plunger assembly 740 is connected to the solenoid element 736. Movement of the solenoid element 736, caused by applying electricity to the coil windings, causes the plunger assembly 740 to be drawn away from the outlet end 716 of the capillary flow passage 712 allowing fuel to flow through the orifice 742. As may be seen, sealing is achieved by the mating of frusto-conical section 744 of plunger assembly 740 with conical sealing surface 752 of housing 750. As may be appreciated, metering section 700 may be combined with conventional actuator sections of the type commonly used in fuel injectors for automotive applications.

Heat source 720 is arranged along capillary flow passage 712 and is provided by forming capillary flow passage 712 from a tube of electrically resistive material, a portion of capillary flow passage 712 forming a heater element when a source of electrical current is connected to the tube at connections 722 and 724 for delivering current. Heat source 720 is then operable to heat the liquid fuel in capillary flow passage 712 to a level sufficient to change at least a portion thereof from a liquid state to a vapor state and deliver a stream of substantially vaporized fuel from outlet end 716 of capillary flow passage 712. As may be appreciated, the volume of material of plunger assembly 740 that comes into contact with the vaporized fuel is minimal, making the thermal mass that must be heated in order to prevent premature condensation of the vapor small.

FIG. 6 presents another fuel injector metering section 800 for vaporizing a liquid fuel, in accordance with yet another preferred form. Fuel injector metering section 800 includes at least one capillary flow passage 812, having an inlet end 814 and an outlet end 816, inlet end 814 placed in fluid communication with a liquid fuel source for introducing the liquid fuel into capillary flow passage 812. Advantageously, fuel injector metering section 800 may include two, three or four capillaries, so that a full range of operation may be provided by the injector (see FIG. 6B).

Heat source 820 is arranged along capillary flow passage 812 and is provided by forming capillary flow passage 812 from a tube of electrically resistive material, a portion of capillary flow passage 812 forming a heater element when a source of electrical current is connected to the tube at connections 822 and 824 for delivering current. Heat source 820 is then operable to heat the liquid fuel in capillary flow passage 812 to a level sufficient to change at least a portion thereof from a liquid state to a vapor state and deliver a stream of substantially vaporized fuel from outlet end 816 of capillary flow passage 812.

Another design for a plunger valve assembly 818 is shown which is positionable within housing 850 and operated by a solenoid, having coil windings (not shown). In operation, when the coil windings are energized, the solenoid element 836 is drawn into the center of coil windings (not shown). When electricity is cut off, solenoid element 836 returns to its original position, through the use of a spring (not shown), sealing off the flow of fuel from the outlet end 816 of capillary flow passage 812. As shown, plunger 840 is connected to the solenoid element 836. Movement of the solenoid element 836, caused by applying electricity to the coil windings, causes the plunger assembly 840 to be drawn away from the outlet end 816 of the capillary flow passage 812 allowing fuel to flow through the orifice 842. As may be seen, plunger valve assembly 818 moves within plunger sleeve 854. Plunger sleeve 854 is kept from rotating during operation by sleeve pin 856. Sealing is achieved by the mating of frusto-conical section 844 of plunger assembly 840 with conical sealing surface 852 of housing 850. In this preferred form, the volume of material of plunger assembly 840, which is minimized in this design, makes the thermal mass that must be heated in order to prevent premature condensation of the vapor small.

Again, metering section 800 may be combined with conventional actuator sections of the type commonly used in fuel injectors for automotive applications.

Referring now to FIG. 7, another fuel injector metering section 900 for vaporizing a liquid fuel is presented, in accordance with another preferred form. Fuel injector metering section 900 includes at least one capillary flow passage 912, having an inlet end 914 and an outlet end 916, inlet end 914 placed in fluid communication with a liquid fuel source for introducing the liquid fuel into capillary flow passage 912. Advantageously, fuel injector metering section 900 may include two, three or four capillaries, so that a full range of operation may be provided by the injector (see FIG. 7B).

A plunger valve assembly 918 is positionable within housing 950 and operated by a solenoid (not shown), having coil windings. As is preferred, in operation, when the coil windings are energized, the solenoid element 936 is drawn into the center of coil windings (not shown). When electricity is cut off, solenoid element 936 returns to its original position, through the use of a spring (not shown). A plunger assembly 940 is connected to the solenoid element 936. Movement of the solenoid element 936, caused by applying electricity to the coil windings, causes the plunger assembly 940 to be drawn away from the outlet end 916 of the capillary flow passage 912 allowing fuel to flow through the orifice 942. As may be seen, sealing is achieved by the mating of frusto-conical section 944 of plunger assembly 940 with conical sealing surface 952 of housing 950. Again, it will be apparent to one skilled in the art that metering section 900 may be combined with conventional actuator sections of the type commonly used in fuel injectors for automotive applications.

As with the other preferred forms disclosed herein, a heat source 920 is arranged along capillary flow passage 912 and is provided by forming capillary flow passage 912 from a tube of electrically resistive material, a portion of capillary flow passage 912 forming a heater element when a source of electrical current is connected to the tube at connections 922 and 924 for delivering current. Heat source 920 is then operable to heat the liquid fuel in capillary flow passage 912 to a level sufficient to change at least a portion thereof from a liquid state to a vapor state and deliver a stream of substantially vaporized fuel from outlet end 916 of capillary flow passage 912. As may be appreciated, the volume of material of plunger assembly 940 that comes into contact with the vaporized fuel is minimal, making the thermal mass that must be heated in order to prevent premature condensation of the vapor small.

Referring now to FIG. 8, a modification to the preferred form of FIG. 7 is shown. Fuel injector metering valve 1000 includes at least one capillary flow passage 1012, having an inlet end 1014 and an outlet end 1016, inlet end 1014 placed in fluid communication with a liquid fuel source for introducing the liquid fuel into capillary flow passage 1012. Preferably, fuel injector metering section 1000 may include two, three or four capillaries, so that a full range of operation may be provided by the injector (see FIG. 8B).

A heat source 1020 is arranged along capillary flow passage 1012 and is provided by forming capillary flow passage 1012 from a tube of electrically resistive material, a portion of capillary flow passage 1012 forming a heater element when a source of electrical current is connected to the tube at connections 1022 and 1024 for delivering current. Heat source 1020 is then operable to heat the liquid fuel in capillary flow passage 1012 to a level sufficient to change at least a portion thereof from a liquid state to a vapor state and deliver a stream of substantially vaporized fuel from outlet end 1016 of capillary flow passage 1012.

A plunger valve assembly 1018 is positionable within housing 1050 and operated by a solenoid (not shown), having coil windings. In operation, when the coil windings are energized, the solenoid element 1036 is drawn into the center of coil windings (not shown). When electricity is cut off, solenoid element 1036 returns to its original position through the use of a spring (not shown). A plunger assembly 1040 is connected to the solenoid element 1036. Movement of the solenoid element 1036, caused by applying electricity to the coil windings, causes the plunger assembly 1040 to be drawn away from the outlet end 1016 of the capillary flow passage 1012 allowing fuel to flow through the orifice 1042. As may be seen, sealing is achieved by the mating of frusto-conical section 1044 of plunger assembly 1040 with conical sealing surface 1056 of housing 1050. As shown, a more refined spray is made possible by providing needle 1046, which protrudes into a smaller orifice 1042 than the orifice provided in the FIG. 7 form. Metering section 1000 may be combined with a conventional actuator section of the type commonly used in fuel injectors for automotive applications.

FIG. 9 presents another fuel injector metering section 1100, in accordance with still another preferred form. Fuel injector metering section 1100 includes at least one capillary flow passage 1112, having an inlet end 1114 and an outlet end 1116, inlet end 1114 placed in fluid communication with a liquid fuel source for introducing the liquid fuel into capillary flow passage 1112. Preferably, fuel injector metering section 1100 may include two, three or four capillaries, so that a full range of operation may be provided by the injector (see FIG. 9B).

Heat source 1120 is arranged along capillary flow passage 1112 and is provided by forming capillary flow passage 1112 from a tube of electrically resistive material, a portion of capillary flow passage 1112 forming a heater element when a source of electrical current is connected to the tube at connections 1122 and 1124 for delivering current. Heat source 1120 is then operable to heat the liquid fuel in capillary flow passage 1112 to a level sufficient to change at least a portion thereof from a liquid state to a vapor state and deliver a stream of substantially vaporized fuel from outlet end 1116 of capillary flow passage 1112.

Another design for a plunger valve assembly 1118 is shown which is positionable within housing 1150 and operated by a solenoid, having coil windings (not shown). In operation, when the coil windings are energized, the solenoid element 1136 is drawn into the center of coil windings (not shown). When electricity is cut off, solenoid element 1136 returns to its original position, through the use of a spring (not shown), sealing off the flow of fuel from the outlet end 1116 of capillary flow passage 1112. As shown, plunger 1140 is connected to the solenoid element 1136. Movement of the solenoid element 1136, caused by applying electricity to the coil windings, causes the plunger assembly 1140 to be drawn away from the outlet end 1116 of the capillary flow passage 1112 allowing fuel to flow through the orifice 1142.

As may be seen, plunger valve assembly 1118 moves within plunger sleeve 1154. Plunger sleeve 1154 is kept from rotating during operation by sleeve pin 1156. Sealing is achieved by the mating of frusto-conical section 1144 of plunger assembly 1140 with conical sealing surface 1152 of housing 1150. As shown, a more refined spray is made possible by providing a large needle 1146, which protrudes into orifice 1142. Metering section 1100 may be combined with a conventional actuator section of the type commonly used in fuel injectors for automotive applications.

Referring now to FIG. 10, fuel injector metering section 1200 includes at least one capillary flow passage 1212, having an inlet end 1214 and an outlet end 1216, inlet end 1214 placed in fluid communication with a liquid fuel source for introducing the liquid fuel into capillary flow passage 1212. Preferably, fuel injector metering section 1200 may include two, three or four capillaries, so that a full range of operation may be provided by the injector (see FIG. 10B).

Heat source 1220 is arranged along capillary flow passage 1212 and is provided by forming capillary flow passage 1212 from a tube of electrically resistive material, a portion of capillary flow passage 1212 forming a heater element when a source of electrical current is connected to the tube at connections 1222 and 1224 for delivering current. Heat source 1220 is then operable to heat the liquid fuel in capillary flow passage 1212.

A plunger valve assembly 1218 is shown which is positionable within housing 1250 and operated by a solenoid, having coil windings (not shown). In operation, when the coil windings are energized, the solenoid element 1236 is drawn into the center of coil windings (not shown). When electricity is cut off, solenoid element 1236 returns to its original position, through the use of a spring (not shown), sealing off the flow of fuel from the outlet end 1216 of capillary flow passage 1212. As shown, plunger rod 1240 is connected to the solenoid element 1236. Movement of the solenoid element 1236, caused by applying electricity to the coil windings, causes the plunger rod 1240 to be drawn away, together with sealable sleeve 1254, from the outlet end 1216 of the capillary flow passage 1212 allowing fuel to flow through the orifice 1242.

Plunger rod 1240 is press fit within sealable sleeve 1254. Sealing is achieved by the mating of frusto-conical section 1244 of sealable sleeve 1254 with conical sealing surface 1252 of housing 1250. As shown, a more refined spray is made possible by providing a large needle 1246, which protrudes into orifice 1242. Metering section 1100 may be combined with a conventional actuator section of the type commonly used in fuel injectors for automotive applications.

Figure 11:
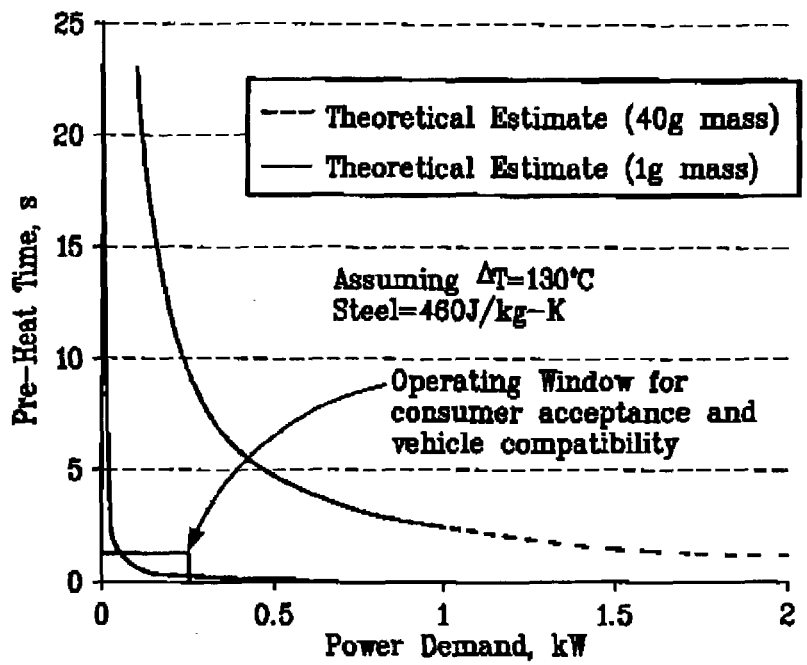
FIG. 11 is a chart illustrating the trade-off between minimizing the power supplied to the injector and minimizing the warm-up time associated with the injector for different heated masses.

To achieve vaporization in a cold engine environment, there exists a tradeoff between minimizing the power supplied to the injector for heating and minimizing the associated warm-up time, as shown in FIG. 11. As may be appreciated, the power available to heat the injector is limited to the available battery power, while the injector warm-up time is limited by consumer performance requirements.

Figure 12:
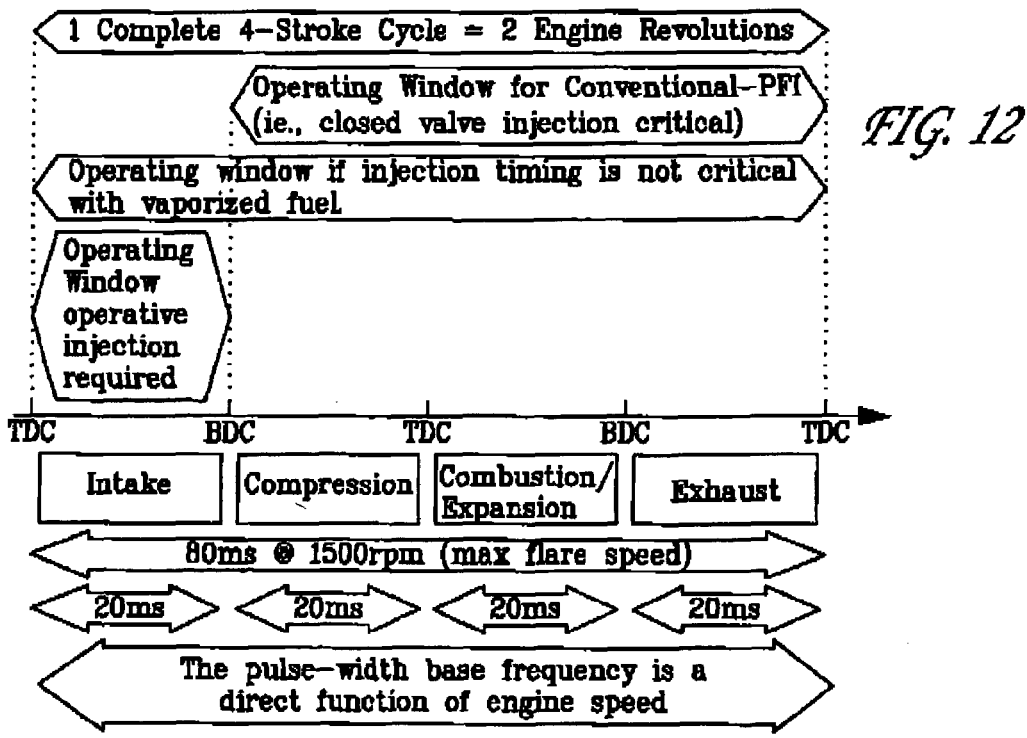
FIG. 12 is a chart illustrating that maximum emission reduction may be achieved by injecting vapor only during the portion of the engine cycle in which the intake valves are open.

In addition to the design and performance requirements outlined above, it is also necessary to have some degree of control over the fuel/air ratio as necessitated by the exhaust after-treatment scheme and/or the start-up control strategy. At a minimum, the fuel injector must have the capacity to accommodate the requisite turndown ratio, from cranking to idle to other engine operating conditions. However, in some forms, maximum emission reduction is achieved by injecting vapor only during the portion of the engine cycle in which the intake valves are open. Such an injection profile is illustrated in FIG. 12, together with the approximate times associated with each portion of a four-stroke cycle. As indicated, at 1500 rpm, open valve injection is achieved through control of the vapor flow rate such that injection occurs for 20 ms followed by a 60 ms period in which little to no vapor is delivered to the engine.

Prior designs using valves to regulate the flow of vapor fuel injectors have been known to produce an undesirable increase in the thermal mass, which is the mass that must be heated in order to achieve sufficient temperature to vaporize the liquid. This increase in thermal mass is undesirable because it increases the warm-up time of the injector (see FIG. 11) and, as such, compromises the vapor quality issued from the injector during startup and/or transient operation.

Figure 13:
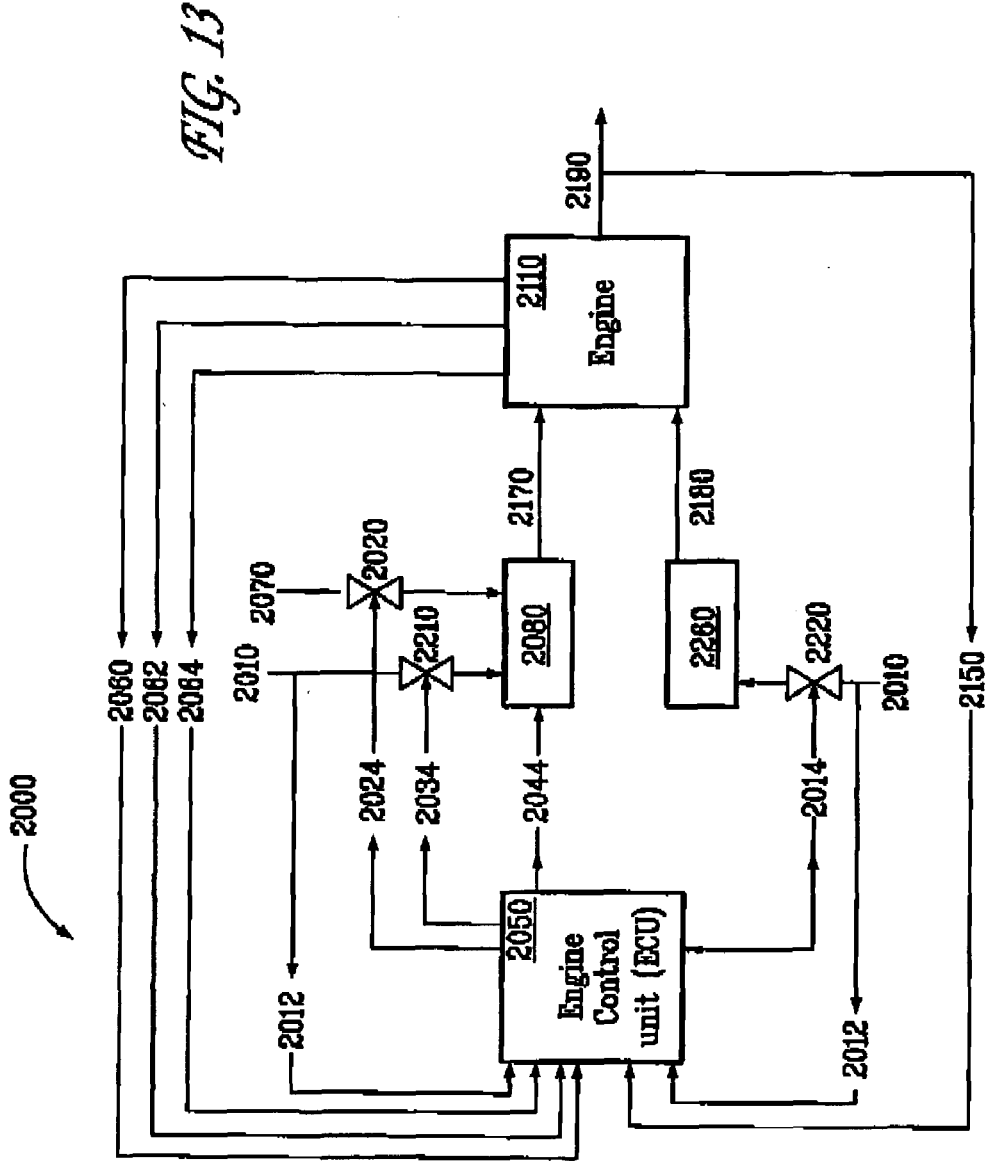
FIG. 13 is a schematic of a fuel delivery and control system, in accordance with a preferred form.

Referring now to FIG. 13, an exemplary schematic of a control system 2000 is shown. Control system 2000 is used to operate an internal combustion engine 2110 incorporating a liquid fuel supply valve 2220 in fluid communication with a liquid fuel supply 2010 and a liquid fuel injection path 2260, a vaporized fuel supply valve 2210 in fluid communication with a liquid fuel supply 2010 and capillary flow passages 2080, and an oxidizing gas supply valve 2020 in fluid communication with an oxidizing gas supply 2070 and capillary flow passages 2080. The control system includes a controller 2050, which typically receives a plurality of input signals from a variety of engine sensors such as engine speed sensor 2060, intake manifold air thermocouple and intake pressure sensor 2062, coolant temperature sensor 2064, exhaust air-fuel ratio sensor 2150, fuel supply pressure 2012, etc. In operation, the controller 2050 executes a control algorithm based on one or more input signals and subsequently generates an output signal 2024 to the oxidizer supply valve 2020 for cleaning clogged capillary passages in accordance with the invention, an output signal 2014 to the liquid fuel supply valve 2220, an output signal 2034 to the fuel supply valve 2210, and a heating power command 2044 to a power supply which delivers power to heat to the capillaries 2080.

In operation, the system according to the invention can be configured to feed back heat produced during combustion through the use of exhaust gas recycle heating, such that the liquid fuel is heated sufficiently to substantially vaporize the liquid fuel as it passes through the capillary flow passages 2080 reducing or eliminating or supplementing the need to electrically or otherwise heat the capillary flow passages 2080.

As will be appreciated, the preferred forms of fuel injectors depicted in FIGS. 1 through 13 may also be used in connection with another embodiment of the present invention. Referring again to FIG. 1, injector 10 may also include means for cleaning deposits formed during operation of injector 10. The means for cleaning deposits may include heat source 20 and an oxidizer control valve 26 (see also 2020 of FIG. 13) for placing capillary flow passage 12 in fluid communication with a source of oxidizer. As may be appreciated, the oxidizer control valve 26 can be located at or near either end of capillary flow passage 12 or configured to be in fluid communication with either end of capillary flow passage 12. If the oxidizer control valve 26 Is located at or near the outlet end 16 of capillary flow passage 12, it then serves to place the source of oxidizer in fluid communication with the outlet end 16 of capillary flow passage 12. In operation, heat source 20 is used to heat the oxidizer in capillary flow passage 12 to a level sufficient to oxidize deposits formed during the heating of the liquid fuel F. In one embodiment, to switch from a fueling mode to a cleaning mode, the oxidizer control valve 26 (see also 2020 of FIG. 13) is operable to alternate between the introduction of liquid fuel F and the introduction of oxidizer into capillary flow passage 12 and enable in-situ cleaning of capillary flow passage 12 when the oxidizer is introduced into the at least one capillary flow passage.

One technique for oxidizing deposits includes passing air or steam through the capillary. The flow passage is preferably heated during the cleaning operation so that the oxidation process is initiated and nurtured until the deposits are consumed. To enhance this cleaning operation, a catalytic substance may be employed, either as a coating on, or as a component of the capillary wall to reduce the temperature and/or time required for accomplishing the cleaning. For continuous operation of the fuel delivery system, more than one capillary flow passage can be used such that when a clogged condition is detected, such as by the use of a sensor, or a change in capillary resistance, fuel flow can be diverted to another capillary flow passage and oxidant flow initiated through the clogged capillary flow passage to be cleaned. As an example, a capillary body can include a plurality of capillary flow passages therein and a valving arrangement can be provided to selectively supply liquid fuel or air to each flow passage.

Alternatively, fuel flow can be diverted from a capillary flow passage and oxidant flow initiated at preset intervals. As shown in FIG. 13, fuel delivery to a capillary flow passage can be effected by a controller 2050. For example, the controller 2050 can activate fuel delivery for a preset time period and deactivate fuel delivery after the preset amount of time. The controller 2050 may also effect adjustment of the pressure of the liquid fuel and/or the amount of heat supplied to the capillary flow passage based on one or more sensed conditions. The sensed conditions may include inter alia: the fuel pressure; the capillary temperature; and the air fuel mixture. The controller 2050 may also control multiple fuel delivery devices attached to the application. The controller 2050 may also control one or more capillary flow passages to clear deposits or clogs therefrom. For example, cleaning of a capillary flow passage can be achieved by applying heat to the capillary flow passage and supplying a flow of an oxidant source to the capillary flow passage.

Alternatively, the preferred forms depicted in FIGS. 1 through 13 may also be used in connection with another embodiment of the present invention. Referring again to FIG. 1, the means for cleaning deposits includes placing capillary flow passage 12 in fluid communication with a solvent, enabling the in-situ cleaning of capillary flow passage 12 when the solvent is introduced into capillary flow passage 12. While a wide variety of solvents have utility, the solvent may comprise liquid fuel from the liquid fuel source. When this is the case, no additional valve 26 is required for solvent control, as there is no need to alternate between fuel and solvent. The heat source should be phased-out over time or deactivated during the cleaning of capillary flow passage 12.

Referring again to FIG. 1, the heated capillary flow passage 12 of fuel injector 10 can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 150 to 200 μm Sauter Mean Diameter (SMD), the aerosol has an average droplet size of less than 25 μm SMD, preferably less than 15 μm SMD. Thus, the majority of the fuel droplets produced by the heated capillary according to the invention can be carried by an air stream, regardless of the flow path, into the combustion chamber.

The difference between the droplet size distributions of a conventional injector and the fuel injectors disclosed herein is particularly critical during cold-start and warm-up conditions. Specifically, using a conventional port-fuel injector, relatively cold intake manifold components necessitate over-fueling such that a sufficient fraction of the large fuel droplets, impinging on the intake components, are vaporized to produce an ignitable fuel/air mixture. Conversely, the vaporized fuel and fine droplets produced by the fuel injectors disclosed herein are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector disclosed herein results in greatly reduced cold start emissions compared to those produced by engines employing conventional fuel injector systems. In addition to a reduction in over-fueling, it should also be noted that the heated capillary injectors disclosed herein further enable fuel-lean operation during cold-start and warm-up, which results in a greater reduction in tailpipe emissions while the catalytic converter warms up.

Referring still to FIG. 1, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.020 to 0.030 inches, a heated length of approximately 2 to 10 inches, and fuel can be supplied to the tube 12 at a pressure of less than 100 psig, preferably less than 70 psig, more preferably less than 60 psig and even more preferably less than 45 psig or less. It has been shown that this embodiment produces vaporized fuel that forms a distribution of aerosol droplets that mostly range in size from 2 to 30 μm SMD with an average droplet size of about 5 to 15 μm SMD, when the vaporized fuel is condensed in air at ambient temperature. The preferred size of fuel droplets to achieve rapid and nearly complete vaporization at cold-starting temperatures is less than about 25 μm. This result can be achieved by applying approximately 100 to 400 W, e.g., 200 W of electrical power, which corresponds to 2–3% of the energy content of the vaporized fuel, to a six-inch stainless steel capillary tube. The electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. Electrical leads can be connected to the electrically conductive material to supply the electrical current to the heater so as to heat the tube along its length. Alternatives for heating the tube along its length could include inductive heating, such as by an electrical coil positioned around the flow passage, or other sources of heat positioned relative to the flow passage to heat the length of the flow passage through one or a combination of conductive, convective or radiative heat transfer.

Although, a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches. After cold-start and warm-up, it is not necessary to heat the capillary tube such that the unheated capillary tube can be used to supply adequate liquid fuel to an engine operating at normal temperature.

The vaporized fuel exiting from the fuel capillary can be injected into an engine intake manifold at the same location as existing port-fuel injectors or at another location along the intake manifold. If desired, however, the fuel capillary can be arranged to deliver vaporized fuel directly into each cylinder of the engine. The fuel injectors disclosed herein provide advantages over systems that produce larger droplets of fuel that must be injected against the back side of a closed intake valve while starting the engine. Preferably, the outlet of the capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated, for normal engine operation. Normal engine operation can be performed by liquid fuel injection via continuous injection or pulsed injection, as those skilled in the art will readily recognize.

EXAMPLES

Example 1

In tests using a Ford 4.6 liter V8 engine, one bank of four cylinders was modified to include fuel delivery devices of the invention as shown in FIG. 1. The capillary heating elements were mounted with the tip of the capillary positioned flush with the intake port wall, this being the location of the stock fuel injection nozzle. The tests were carried out with continuous injection (100% duty cycle) and, therefore, fuel pressure was used to regulate the fuel vapor flow rate.

Referring to FIG. 14, a graph illustrating results of the capillary fuel delivery device during the first 20 seconds of cold start of an engine is presented. Plot line 1 represents the engine speed, in revolutions per minute, as time progresses along the x-axis. Plot line 2 represents the fuel flow, in grams per second, as time progresses along the x-axis. Plot line 3 represents lambda as time progresses along the x-axis, wherein a lambda of unity represents the stoichiometric ratio of air to fuel. Plot line 4 represents the total hydrocarbon emissions output, in methane equivalent parts per million, from the exhaust of the engine as time progresses along the x-axis.

Figure 14:
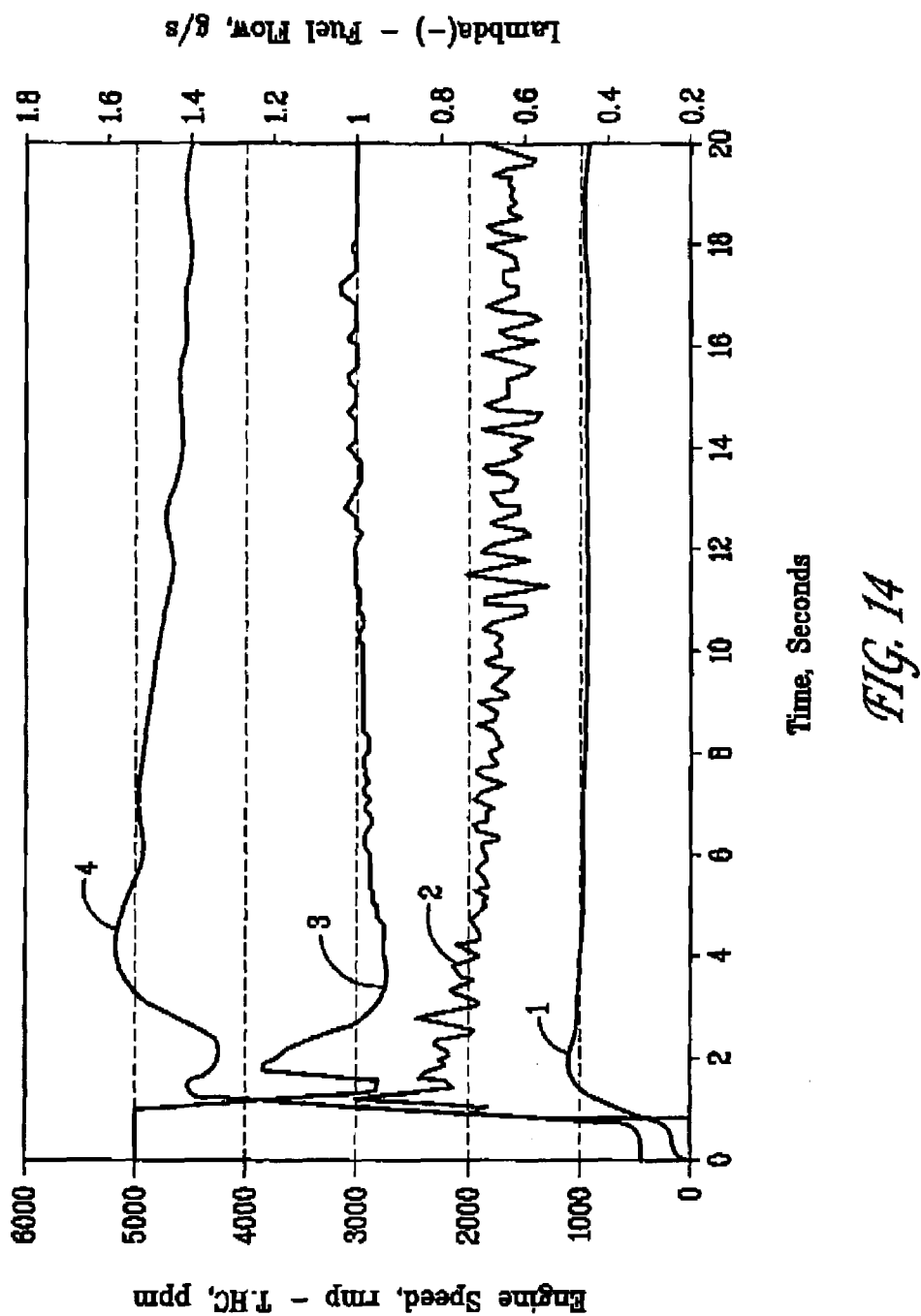
FIG. 14 is a chart illustrating engine parameters during the first 20 seconds of starting in engine using a fuel delivery device of the invention.
Figure 15:
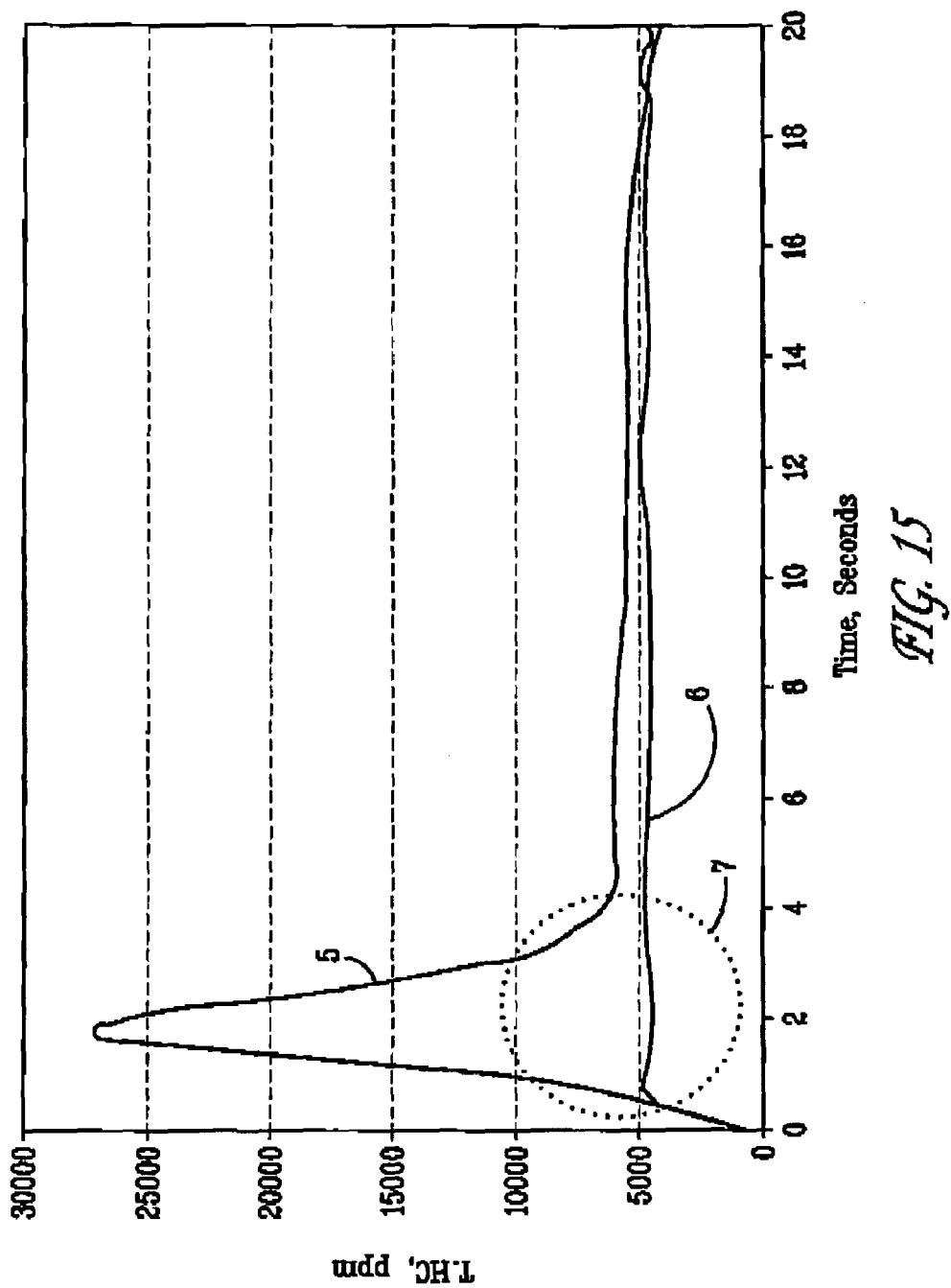
FIG. 15 is a chart illustrating a comparison of engine emissions from a fuel delivery device of the invention with conventional port-fuel injectors.

As illustrated by plot line 3 in FIG. 14, the initial over-fueling required for the stock engine hardware and control strategy was eliminated using the fuel delivery device of the invention. That is, the fuel delivery device of the invention efficiently vaporized liquid fuel during the initial start-up period such that the engine was started with a near-stoichiometric fuel/air ratio. FIG. 15 is a graph that illustrates the emission reduction resulting from the near-stoichiometric start achieved with the fuel delivery device of the invention (plot line 6) compared to the conventional over-fueling start-up strategy (plot line 5). Specifically, the results in FIG. 12 demonstrate that the fuel delivery device of the invention reduced integrated hydrocarbon emissions by 46% during the first ten seconds of cold-start as compared to the stock configuration, which requires over-fueling. The area indicated by circle 7 illustrates the dramatic reduction of hydrocarbon emissions during the first four seconds of starting the engine.

Example 2

Simulated cold-start transient tests were conducted using the dynamometer-mounted Ford 4.6 liter V8 engine of Example 1, wherein one bank of four cylinders was modified to include fuel delivery devices as shown in FIG. 4. The fuel injectors of FIG. 4 were mounted in the location of a stock fuel injection nozzle.

The cold-start transient tests were conducted by initially motoring the engine at 900 RPM, with spark plugs firing at standard spark advance and at a pre-set engine coolant temperature of 20° C. A fuel injection pulse-width was set to achieve a target lambda value, without the use of transient compensation, an R/Ro capillary heater resistance value equal to 1.17 (approximately 170° C.) was set and the fuel injectors enabled. The time to reach a Lambda value equal to 10% of the set-point value was measured, together with total hydrocarbon emissions. Each test was repeated three times for each Lambda value set-point. Lambda values were set to 0.9, 1.0, 1.1 and 1.2 (stoichiometric air-fuel=1.0). Each simulated cold-start transient test was conducted for 30 seconds. The transient exhaust air-fuel ratio response characteristics measured provided a qualitative indication of fuel transport phenomena.

Figure 16:
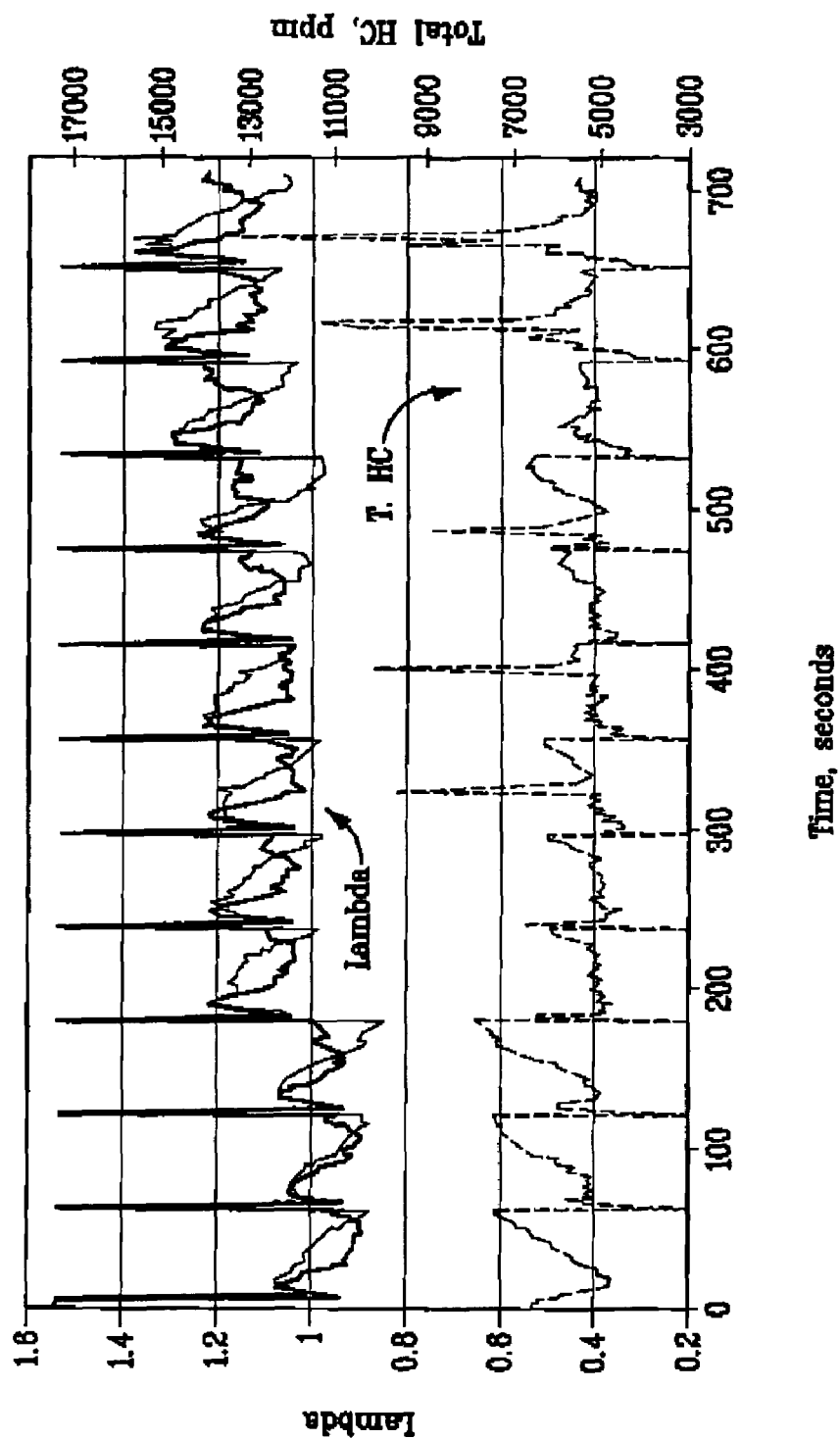
FIG. 16 is a chart presenting results of cold-start transient testing conducted at various lambda values.

Results of the cold-start transient test are presented in FIG. 16. A comparison with standard port fuel injectors (PFI) demonstrated transient response time for the FIG. 4 injectors was vastly superior to a baseline port fuel injector, an indicator of good vaporization. Additionally, a significant improvement in "cold-idle" emissions of unburned hydrocarbons was also observed, with the benefit as high as 25% at $\lambda$=1.2.

Example 3

The effect of capillary heater temperature (increased vaporization) on lean limit extension was studied using the dynamometer-mounted Ford 4.6 liter V8 engine of Examples 1 and 2 employing the capillary fuel injectors of FIG. 4. Values of capillary heater resistance $R/R_o$ were varied over a range of 1.15 to 1.26 (approximately 170 to 280° C.) and hydrocarbon emission levels measured.

Figure 17:
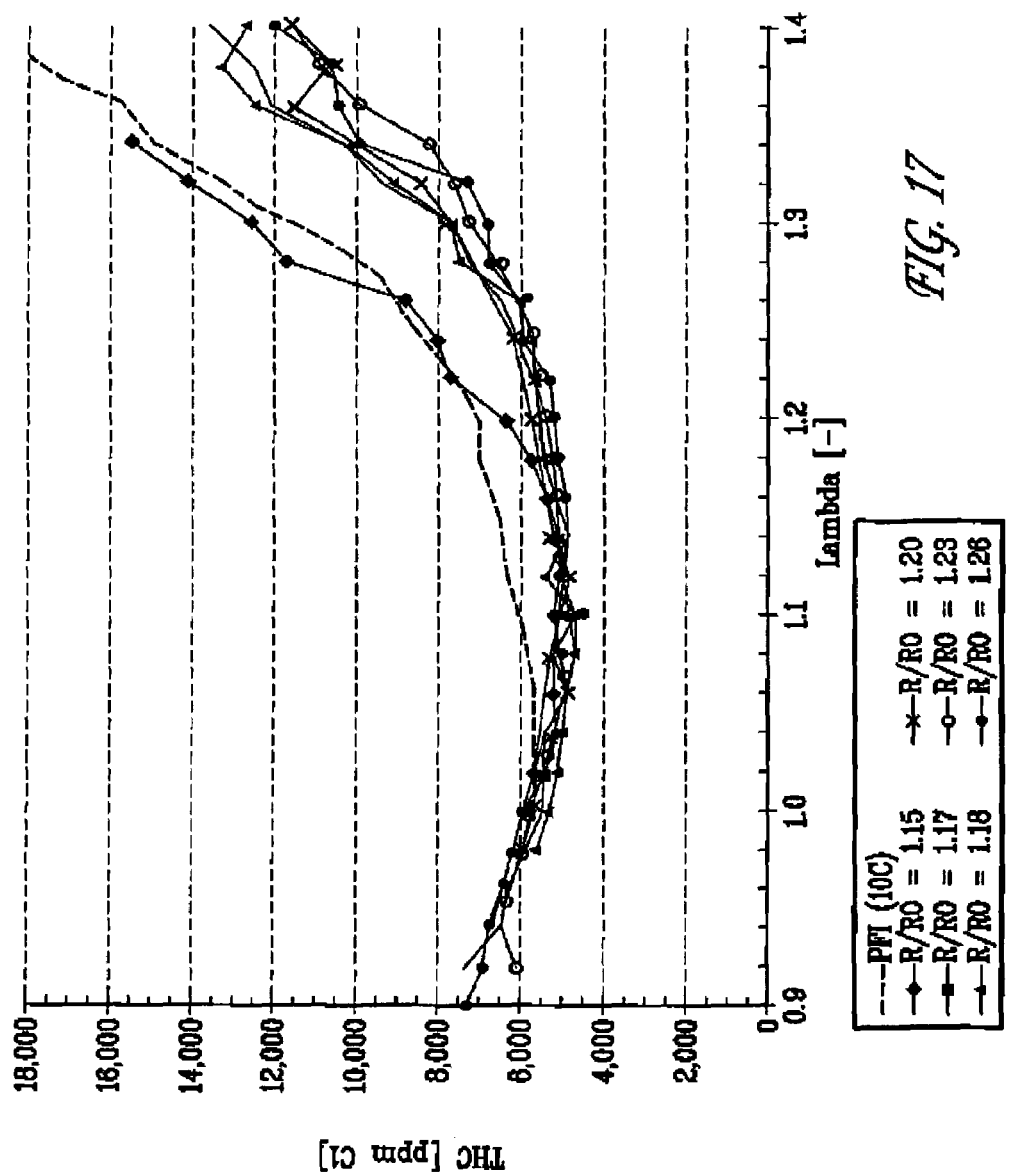
FIG. 17 is a chart illustrating the relationship between lambda and total hydrocarbon emissions at different levels of heat inputs to the capillary injector.

Results of these tests are presented in FIG. 17. As may be seen, significant improvement over standard port fuel injectors was achieved. In addition, it was observed that when increasing resistance settings (capillary passage temperatures) a threshold is quickly reached, beyond which hydrocarbon emissions are relatively insensitive to further increases. For the FIG. 4 capillary injector, the observed threshold was well below the maximum operating temperature.

Examples 4–9

Laboratory bench tests were performed using gasoline supplied at constant pressure with a micro-diaphragm pump system to various capillary injectors at 20° C., to simulate a start-up condition. Peak droplet sizes and droplet size distributions were measured using a Spray-Tech laser diffraction system manufactured by Malvern. With the exception of those values designated as peak values at start-up, droplet sizes are in Sauter Mean Diameter (SMD). SMD is the diameter of a droplet whose surface-to-volume ratio is equal to that of the entire spray and relates to the spray's mass transfer characteristics.

|  | Target Value | FIG. 4 Design | FIG. 5 Design | FIG. 7 Design | FIG. 8 Design | FIG. 9 Design | FIG. 10 Design |
|---|---|---|---|---|---|---|---|
| Start-up droplet size (μm) | <30 | 12 | 19 | 41 | 23 | 28 | 24 |
| Peak Start-up droplet size (μm) | Min. | 84 | 74 | 75 | 69 | 72 | 55 |
| Droplet size after ten sec. (μm) | <30 | 7 | 13 | 39 | 14 | 22 | N/A |
| Stabilization time (sec.) | <2.0 | 1.5 | 1.2 | 4.5 | 1.5 | 2.3 | 2.6 |
| $R/R_o$ | N/A | 1.14 | 1.14 | 1.14 | 1.16 | 1.16 | 1.22 |

As may be seen from the results presented above, the target droplet size range can be achieved using the commercially feasible valve designs herein disclosed. Moreover, after ten seconds of operation, most of the injectors were observed to produce droplet sizes well-below the 30 micron threshold, with thermal mass remaining an important differentiating factor.

Examples 10–17

To further assess the benefits of the present invention, computational fluid dynamics, CFD, were used to evaluate the configurations described below. A CFD analysis solves fundamental controlling equations and is capable of providing fluid velocity, species, combustion reactions, pressure, heat transfer and temperature values at every point in the solution domain. FLUENT™ software from Fluent Inc. was used to perform the analysis. (Fluent, Inc., USA, 10 Cavendish Court, Centerra Resource Park, Lebanon, N.H., 03766-1442).

In order to demonstrate the benefits of the present invention, the operation of an engine employing the capillary injectors described herein was simulated using the FLUENT software package. Modeling conditions employed included: fuel n-octane at 3 bar gauge inlet pressure, fuel at inlet was assumed to be vapor at 200° C., the run conducted assuming vapor does not condense, ambient air was set to 0 bar gage pressure and air temperature assumed to be 27° C. The injector material was assumed to be stainless steel, the thermal conductivity variation with temperature was modeled and the turbulence model employed was the k-ϵ realizable model, so as to more accurately model the jet behavior. The non-equilibrium wall functions were chosen to better model the impinging jets on the center body.

The metal volumes, wetted areas and gas volumes for the geometries studied were as follows:

| | Metal volumes | | | | Metal wetted area | | | | | | Valve gas | |
| | | | | | | Wetted area | | | | | | |
| Geometry | Capillary Volume (mm³) | Valve body volume (mm³) | Needle volume (mm³) | Total volume (mm³) | Total volume minus capillary (mm³) | Wetted area (mm2) | Wetted area minus capillary wetted area (mm2) | Vtotal/ Atotal (mm) | Valve Lift Modeled (in) | Valve Lift Modeled (mm) | Valve gas volume (mm³) | volume minus capillary (mm³) |
|---|---|---|---|---|---|---|---|---|---|---|---|---|
| XVA100042 | 11.5 | 122.6 | 26.3 | 160.4 | 149.9 | 137.2 | 104.6 | 1.42 | 0.0120 | 0.3048 | 33.4 | 24.8 |
| XVA100051 | 11.5 | 122.6 | 21.0 | 155.1 | 143.6 | 137.2 | 104.6 | 1.37 | 0.0120 | 0.3048 | 33.4 | 24.8 |
| XVA100037 | 11.5 | 112.2 | 18.3 | 141.9 | 130.5 | 174.6 | 142.0 | 0.92 | 0.0120 | 0.3048 | 55.8 | 47.2 |
| LO100007 | 11.5 | 5.1 | 0.0 | 16.6 | 5.1 | 55.0 | 22.4 | 0.23 | 0.0598 | 1.5189 | 14.9 | 7.4 |
| XVA100046 | 11.5 | 124.0 | 37.9 | 173.4 | 161.9 | 112.8 | 80.2 | 2.02 | 0.0120 | 0.3048 | 22.8 | 14.2 |
| XVA100027 | 9.4 | 131.4 | 74.2 | 215.0 | 205.6 | 71.4 | 35.6 | 5.78 | 0.0200 | 0.5080 | 16.5 | 6.8 |

Note that geometry XVA100042 is shown in FIG. 8; XVA100051 is depicted in FIG. 10; XVA100037 is as shown in FIG. 7; LO100007 is as shown in FIG. 4; XVA100046 is depicted in FIG. 9; and XVA100027 is as shown in FIG. 5.

Figure 18:
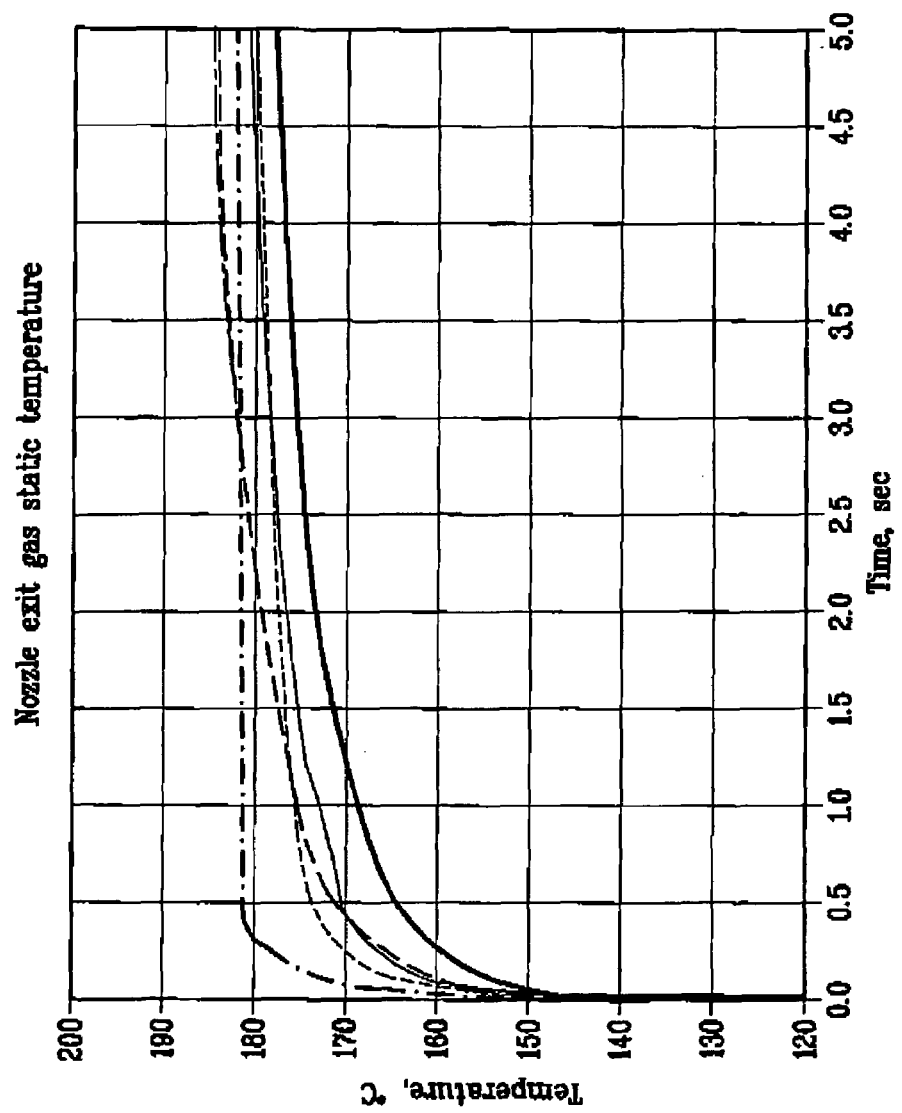
FIG. 18 is a chart presenting predicted temperature rise characteristics for various capillary injector valve designs.
Figure 19:
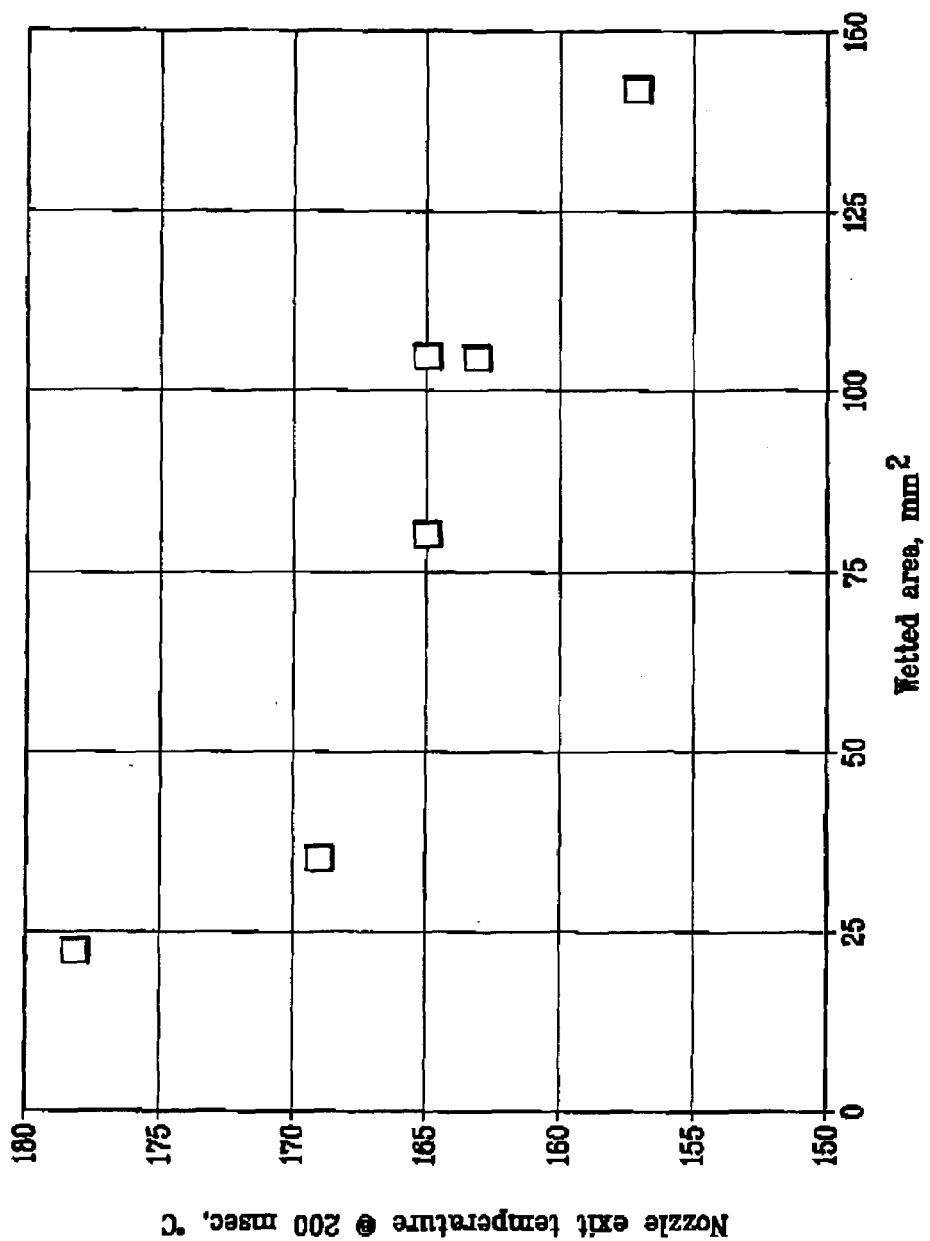
FIG. 19 is a chart illustrating the relationship between wetted area and nozzle exit temperature at 200 milliseconds.

Cold-start results obtained using the FLUENT computational fluid dynamics software for the various capillary injector designs are presented in FIG. 18. FIG. 19 demonstrates the relationship of wetted area versus nozzle exit temperature at 200 milliseconds for the various designs, demonstrating the importance of this design factor on capillary injector performance.

As may be seen from FIGS. 19 and 20, the CFD results support the laboratory bench findings presented in Examples 4–9 and suggest that rapid start-up is achievable as long as the vapor is introduced close to the metering section of the injector.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A fuel injector for vaporizing and metering a liquid fuel to an internal combustion engine, comprising:
    (a) at least one capillary flow passage having an inlet end and at least one outlet end;
    (b) a heat source arranged along said at least one capillary flow passage, said heat source operable to heat the liquid fuel in said at least one capillary flow passage to a level sufficient to change at least a portion thereof from the liquid state to a vapor state and deliver a stream of substantially vaporized fuel from said outlet end of said at least one capillary flow passage; and
    (c) a valve for metering substantially vaporized fuel to the internal combustion engine, said valve located downstream of said outlet end of said at least one capillary flow passage, said valve including a low mass member for substantially occluding the stream of fuel to the internal combustion engine; and
    (d) a nozzle to atomize a portion of the liquid fuel;
wherein said low mass member for substantially occluding the stream of fuel to the internal combustion engine is formed of a material having low mass and/or a low coefficient of thermal conductivity.

2. The fuel injector of claim 1, wherein said low mass member of said valve for metering fuel to the internal combustion engine is a plug member for substantially occluding the stream of fuel from said outlet end of said at least one capillary flow passage.

3. The fuel injector of claim 2, wherein said low mass plug member of said valve for metering fuel to the internal combustion engine is axially aligned with said at least one capillary flow passage.

4. The fuel injector of claim 2, wherein said low mass plug member of said valve for metering fuel to the internal combustion engine is tangentially alignable with said outlet end of said at least one capillary flow passage.

5. The fuel injector of claim 2, wherein said low mass plug member of said valve for metering fuel to the internal combustion engine is a hollow sleeve member for substantially occluding the stream of fuel from said outlet end of said at least one capillary flow passage.

6. The fuel injector of claim 5, wherein said low mass hollow sleeve member of said valve for metering fuel to the internal combustion engine is axially aligned with said at least one capillary flow passage.

7. The fuel injector of claim 6, wherein said low mass hollow sleeve member of said valve for metering fuel to the internal combustion engine has an internal cross sectional area effective for positioning said hollow sleeve member over said at least one capillary flow passage enabling the stream of fuel from said outlet end of said at least one capillary flow passage to be substantially occluded.

8. The fuel injector of claim 1, wherein said low mass member of said valve for metering fuel to the internal combustion engine is a spherical plug member.

9. The fuel injector of claim 8, wherein said at least one capillary flow passage is positionable to enable said outlet end to contact an outer surface of said low mass spherical plug member and occlude the stream of fuel from said outlet end of said at least one capillary flow passage.

10. The fuel injector of claim 1, further comprising:
(e) means for cleaning deposits formed during operation of the apparatus injector.

11. The fuel injector of claim 10, wherein said means for cleaning deposits includes said heat source and an oxidizer control valve for placing said at least one capillary flow passage in fluid communication with an oxidizer, said heat source also being operable to heat the oxidizer in said at least one capillary flow passage to a level sufficient to oxidize deposits formed during the heating of the liquid fuel, wherein said oxidizer control valve for placing said at least one capillary flow passage in fluid communication with an oxidizer is operable to alternate between the introduction of liquid fuel and the introduction of oxidizer into said capillary flow passage and enable in-situ cleaning of said capillary flow passage when the oxidizer is introduced into said at least one capillary flow passage.

12. The fuel injector of claim 11, wherein the oxidizer comprises air, exhaust gas, steam and mixtures thereof.

13. The fuel injector of claim 10, wherein said means for cleaning deposits includes a solvent control valve for placing said at least one capillary flow passage in fluid communication with a solvent, said solvent control valve disposed at one end of said at least one capillary flow passage, and wherein said solvent control valve for placing said at least one capillary flow passage in fluid communication with a solvent is operable to alternate between the introduction of liquid fuel and the introduction of solvent into said capillary flow passage and enable in-situ cleaning of said capillary flow passage when the solvent is introduced into said at least one capillary flow passage.

14. The fuel injector of claim 13, wherein the solvent comprises liquid fuel from the liquid fuel source and wherein the heat source is phased-out during cleaning of said capillary flow passage.

15. The fuel injector of claim 10, wherein the means for cleaning deposits employs a solvent comprising liquid fuel from the liquid fuel source and wherein the heat source is phased-out during cleaning of said capillary flow passage.

16. The fuel injector of claim 1, further including a solenoid to actuate said valve for metering fuel to the internal combustion engine.

17. The fuel injector of claim 1, wherein said at least one capillary flow passage is a helical passage.

18. The fuel injector of claim 1, further comprising a non-capillary liquid fuel flow passage, said non-capillary liquid fuel flow passage having an inlet end and an outlet end, said inlet end in fluid communication with the liquid fuel supply.

19. The fuel injector of claim 18, further comprising:
(e) a first fluid control valve for placing said inlet end of said capillary liquid fuel flow passage in fluid communication with a liquid fuel supply, and
(f) a second fluid control valve for placing said inlet end of said non-capillary liquid fuel flow passage in fluid communication with the liquid fuel supply, wherein both of said fluid control valves for placing said inlet end of said capillary liquid fuel flow passage in fluid communication with a liquid fuel supply and said valve for placing said inlet end of said non-capillary liquid fuel flow passage in fluid communication with the liquid fuel supply share a valve body controllable to direct fuel to said at least one capillary flow passage and said liquid fuel flow passage.

20. The fuel injector of claim 1, wherein said heat source includes a resistance heater.

21. A fuel system for use in an internal combustion engine, comprising:
(a) a plurality of fuel injectors, each injector including
(i) at least one capillary flow passage having an inlet end and an outlet end;
(ii) a heat source arranged along the at least one capillary flow passage, said heat source operable to heat the liquid fuel therein in said at least one capillary flow passage to a level sufficient to change at least a portion thereof from the liquid state to a vapor state and deliver a stream of substantially vaporized fuel from said outlet end of said at least one capillary flow passage;
(iii) a valve for metering substantially vaporized fuel to the internal combustion engine, said valve located downstream of said outlet end of said at least one capillary flow passage, said valve including a low mass member for substantially occluding the stream of fuel to the internal combustion engine; wherein said low mass member for substantially occluding the stream of fuel to the internal combustion engine is formed of a material having a low mass and/or a low coefficient of thermal conductivity;
(iv) a nozzle to atomize a portion of the liquid fuel;
(b) a liquid fuel supply system in fluid communication with said plurality of fuel injectors; and
(c) a controller to control the supply of fuel to said plurality of fuel injectors.

22. The fuel system of claim 21, wherein said low mass member of said valve for metering fuel to the internal combustion engine is a plug member for substantially occluding the stream of fuel from said outlet end of said at least one capillary flow passage.

23. The fuel system of claim 22, wherein said low mass member of said valve for metering fuel to the internal combustion engine is a hollow sleeve member for substantially occluding the stream of fuel from said outlet end of said at least one capillary flow passage.

24. The fuel system of claim 23, wherein said low mass hollow sleeve member of said valve for metering fuel to the internal combustion engine is axially aligned with said at least one capillary flow passage.

25. The fuel system of claim 24, wherein said low mass hollow sleeve member has an internal cross sectional area effective for positioning said hollow sleeve member of said valve for metering fuel to the internal combustion engine over said at least one capillary flow passage enabling the stream of fuel from said outlet end of said at least one capillary flow passage to be substantially occluded.

26. The fuel system of claim 21, further comprising means for cleaning deposits formed during operation of the apparatus.

27. The fuel system of claim 26, wherein said means for cleaning deposits includes said heat source and an oxidizer control valve for placing said at least one capillary flow passage in fluid communication with an oxidizer, said heat source also being operable to heat the oxidizer in said at least one capillary flow passage to a level sufficient to oxidize deposits formed during the heating of the liquid fuel, wherein said oxidizer control valve for placing said at least one capillary flow passage in fluid communication with an oxidizer is operable to alternate between the introduction of liquid fuel and the introduction of oxidizer into said capillary flow passage and enable in-situ cleaning of said capillary flow passage when the oxidizer is introduced into said at least one capillary flow passage.

28. The fuel system of claim 26, wherein the means for cleaning deposits employs a solvent comprising liquid fuel from the liquid fuel source and wherein the heat source is phased-out during cleaning of said capillary flow passage.

29. The fuel system of claim 21, wherein said at least one capillary flow passage is a helical passage.

30. The fuel system of claim 21, wherein said heat source includes a resistance heater.

31. A method of delivering fuel to an internal combustion engine, comprising the steps of:
 (a) supplying liquid fuel to at least one capillary flow passage of a fuel injector;
 (b) causing a stream of substantially vaporized fuel to pass through an outlet of the at least one capillary flow passage by heating the liquid fuel in the at least one capillary flow passage;
 (c) metering the vaporized fuel to a combustion chamber of the internal combustion engine through a valve located downstream of the outlet end of the at least one capillary flow passage, the valve including a low mass member for substantially occluding the stream of fuel to the internal combustion engine; and
 (d) atomizing a portion of the liquid fuel through a nozzle;
 wherein the low mass member for substantially occluding the stream of fuel to the internal combustion engine is formed of a material having a low mass and/or a low coefficient of thermal conductivity.

32. The method of claim 31, wherein said delivery of vaporized fuel to the combustion chamber of the internal combustion engine is limited to start-up and warm-up of the internal combustion engine.

33. The method of claim 32, further comprising delivering liquid fuel to the combustion chamber of the internal combustion engine when the internal combustion engine is at a fully warmed condition.

34. The method of claim 33, wherein a liquid fuel injector is operated to deliver liquid fuel to the at least one combustion chamber of the internal combustion engine.

35. The method of claim 31, further comprising cleaning periodically the at least one capillary flow passage.

36. The method of claim 35, wherein said periodic cleaning comprises (i) halting liquid fuel flow to the at least one capillary flow passage, (ii) supplying an oxidizer to the at least one capillary flow passage and (iii) heating the at least one capillary flow passage whereby deposits formed in the at least one capillary flaw passage are oxidized.

37. The method of claim 36, further comprising selectively supplying fuel and oxidizer to the at least one capillary flow passage, wherein the supply selection is achieved by a valve mechanism operated by a controller.

38. The method of claim 37, wherein the oxidizer includes pressurized air, exhaust gas, steam and mixtures thereof.

39. The method of claim 35, wherein said periodic cleaning comprises (i) phasing-out said heating of the at least one capillary flow passage, (ii) supplying a solvent to the at least one capillary flow passage, whereby deposits formed in the at least one capillary flow passage are removed.

40. The method of claim 39, wherein the solvent includes liquid fuel from the liquid fuel source.

* * * * *